United States Patent [19]
Deran

[11] Patent Number: 5,283,894
[45] Date of Patent: Feb. 1, 1994

[54] LOCKLESS CONCURRENT B-TREE INDEX META ACCESS METHOD FOR CACHED NODES

[76] Inventor: Roger L. Deran, 1958 Menalto Ave., Menlo Park, Calif. 94025

[21] Appl. No.: 648,142

[22] Filed: Jan. 30, 1991

Related U.S. Application Data

[60] Division of Ser. No. 393,093, Aug. 2, 1989, Pat. No. 5,010,478, which is a continuation of Ser. No. 850,961, Apr. 11, 1986, abandoned.

[51] Int. Cl.⁵ .............................. G06F 15/417
[52] U.S. Cl. .................. 395/600; 364/DIG. 1; 364/282.1; 364/283.4; 364/282.4
[58] Field of Search ............ 395/600; 364/DIG. 1, 364/DIG. 2

[56] References Cited

U.S. PATENT DOCUMENTS

| | | | |
|---|---|---|---|
| 4,606,002 | 8/1986 | Waisman et al. | 395/600 |
| 4,611,298 | 9/1986 | Schuldt | 395/600 |
| 4,677,550 | 6/1987 | Ferguson | 395/600 |
| 4,719,571 | 1/1988 | Rissamen et al. | 395/600 |
| 4,914,569 | 4/1990 | Levine et al. | 395/500 |
| 4,945,475 | 7/1990 | Bruffey et al. | 395/600 |

Primary Examiner—Thomas C. Lee
Assistant Examiner—L. Donaghue

[57] ABSTRACT

A user interface for a database management system uses an interactive display to display information selected from the database in magnitude ordered rows comprising a set of items. Each row is an assertion consisting of a plurality of components including an entity, an attribute and a value of the attribute. The components are arranged in that fixed order in decreasing significance, respectively. In the database management system, the database is itself also stored in this format. A database engine in the database management system utilizes a B-tree index to the database and a meta accessing method for items from the database in a working cache.

25 Claims, 6 Drawing Sheets

FIG. 1  INFINITY LAYERS

| | |
|---|---|
| PRESENTATION 18 | THE ITEM EDITOR, APPLICATIONS PROGRAMS |
| CONSISTENCY 16 | INVERSION, CLASSIFICATION, GENERALIZATION |
| REPRESENTATION 14 | THE ENCODING OF COMPONENTS OF ITEMS |
| ENGINE 12 | THE ITEM SPACE |

FIG. 2  DBMS LIMITATIONS

| 20 PARAMETER | INFINITY 22 ENTITY-ATTRIBUTE | TYPICAL 24 RELATIONAL |
|---|---|---|
| MAXIMUM ATTRIBUTES PER DATABASE | INFINITE | 20 TO 1024 |
| " ATTRIBUTES PER RELATION | INFINITE | 10 TO 255 |
| " BYTES PER VALUE | APPROXIMATELY 30 (NOTE 1) | 30 TO 255 |
| " BYTES PER KEY | APPROXIMATELY 30 (NOTE 2) | 10 TO 30 |
| " BYTES PER RELATION | INFINITE | 65K TO 16M |
| " BYTES PER TUPLE | INFINITE | 255 TO 4096 |
| " BYTES PER ATTRIBUTE | INFINITE | 30 TO 255 |
| " INVERSIONS PER DATABASE | INFINITE | 0..255 |
| " INVERSIONS PER RELATION | INFINITE | 0..10 |
| " RELATIONS OPEN | INFINITE | 2..20 |
| " RELATIONS PER DATABASE | INFINITE | 1..255 |
| " SORT DEPTH | INFINITE (NOTE 3) | 1..10 |
| " TUPLES PER RELATION | INFINITE | 1000..16M (65K COMMON) |
| " VALUES PER ATTRIBUTE | INFINITE | 1 |
| MINUMUM VALUES PER ATTRIBUTE | 0 | 1 |
| " BYTES PER ATTRIBUTE | 0 | 1 TO 255 |

NOTE 1: LONGER VALUES ARE STORED AS MULTIPLE, SHORTER VALUES.
NOTE 2: LONGER KEYS ARE AUTOMATICALLY ABBREVIATED (OR UNNECESSARY.)
NOTE 3: SORTING IS RARELY NEEDED, SINCE INVERSION IS COMPLETE.

COMPONENT ENCODING

| BYTE 0 | LENGTH | COMPONENT TYPE | EXPLANATION |
|---|---|---|---|
| 0 | 1 | -INFINITY | |
| 1 | 1 | SYMBOLIC | CONTAINS ALPHANUMERIC VALUES 128..255 ASCII, BUT WITH UC, LC INTERLEAVED. |
| 2 | 1 | BINARY | NEGATIVE EXPANSION ("BINARY-INFINITY") |
| 3..34 | 33..2 | " | TWO'S COMPLEMENT NEG. BINARY INTEGER |
| 35 | 1 | " | BINARY ZERO |
| 36..67 | 2..33 | " | POSITIVE BINARY INTEGER |
| 68 | 1 | " | POSITIVE EXPANSION ("BINARY + INFINITY") |
| 69 | 1 | DECIMAL | NEGATIVE EXPASION ("DEC.-INFINITY") |
| 70 | 5 | " | +FOUR BYTE EXPONENT,-DECIMAL NUMBER |
| 71 | 3 | " | +TWO BYTE EXPONENT,- DECIMAL NUMBER |
| 72 | 2 | " | +ONE BYTE EXPONENT,-DECIMAL NUMBER |
| 73 | 1 | " | ZERO EXPONENT,-DECIMAL NUMBER |
| 74 | 2 | " | -ONE BYTE EXPONENT,-DECIMAL NUMBER |
| 75 | 3 | " | -TWO BYTE EXPONENT,-DECIMAL NUMBER |
| 76 | 5 | " | -FOUR BYTE EXPONENT,-DECIMAL NUMBER |
| 77 | 1 | " | DECIMAL ZERO |
| 78 | 5 | " | -FOUR BYTE EXPONENT,+DECIMAL NUMBER |
| 79 | 3 | " | -TWO BYTE EXPONENT,+DECIMAL NUMBER |
| 80 | 2 | " | -ONE BYTE EXPONENT,+DECIMAL NUMBER |
| 81 | 1 | " | ZERO EXPONENT,+DECIMAL NUMBER |
| 82 | 2 | " | +ONE BYTE EXPONENT,+DECIMAL NUMBER |
| 83 | 3 | " | +TWO BYTE EXPONENT,+DECIMAL NUMBER |
| 84 | 5 | " | +FOUR BYTE EXPONENT,+DECIMAL NUMBER |
| 85 | 1 | " | POSITIVE EXPANSION ("DEC.+INFINITY") |
| 86..126 | | SPECIAL | CODES FOR SPECIAL PURPOSES |
| 127 | 1 | +INFINITY | |
| 128..255 | | | ILLEGAL AS BYTE ZERO OF A COMPONENT |

FIG. 3

LOCKLESS CONCURRENT B-TREE INDEX META ACCESS METHOD FOR CACHED NODES

This is a divisional of application Ser. No. 07/393,093, filed Aug. 2, 1989, now U.S. Pat. NO. 5,010,478, which, in turn, is a continuation of application Ser. No. 06/850,961, filed Apr. 11, 1986, now abandoned.

BACKGROUND OF THE INVENTION

1. Field of the Invention

This invention relates to an improved database interface, database management system (DBMS) and database engine employing the "Entity-Attribute" data model. More particularly, it relates to such a database interface, management system and engine that incorporates a data model that corresponds closely to an information organization scheme that a human user would employ naturally. Most especially, the invention relates to such a database interface, management system and engine that is significantly faster in the execution of its data manipulation functions than conventional database management interfaces, systems and engines.

The invention further relates to improvements in interactive data storage and retrieval by computer with a video display terminal, keyboard, one or more direct access mass storage devices such as flexible or fixed disks, a processor, and random access memory. More particularly, it further relates to a method of externally displaying and internally representing computer-stored information which has advantages in: (1) ease of use; (2) ease of learning; (3) simplified combination and separation of databases which were possibly created at different times or by different users; (4) simplified internal manipulation of data; and (5) increased performance. Even more specifically, the invention relates to the combination of the prior-art Entity-Attribute semantic data model or some variant of it with the supporting "Item Space" logical data structure. Most specifically, the invention relates to: (1) the display of Entity-Attribute structured information on an interactive video terminal or on paper in a value-ordered, one-row-per-Attribute mode; (2) the encoding of the connection between an Entity and an Attribute into one or more "composite keys", hereafter called "Items"; (3) the simplified internal manipulation of information so encoded, such as especially the directness of merging separate databases into one or of separating one database into several; (4) the increased performance flowing out of the simplification of the internal manipulation of information so encoded; (5) the increased performance flowing out of the compatibility of information so encoded with the "Engine", which uses an improved B-tree algorithm; (6) the improvements to the B-tree algorithm utilized in the Engine.

2. Description of the Prior Art

A variety of data models are employed in prior art database management systems. The most widely known and employed data models in the prior art are of the hierarchical, network and relational types. The hierarchical model is the oldest of these models. IBM's Information Management System is representative of this type. In this approach, a plurality of subordinate records are organized under a root record, with as many levels as are appropriate. One of the major shortcomings of the hierarchical model is that real world situations frequently do not fit into a hierarchical structure. As a result of constraints imposed by the hierarchical model, such a database contains redundant information in its records, the consistency of which must be maintained manually. Insertions and deletions of some kinds of information produce anomalies, or unavoidable inconsistencies, in the database.

As a result of these and other shortcomings of the hiearchical model, the 1971 Conference on Data Systems and Languages resulted in the CODASYL model, which is the most widely used network data model. In the network data model, database queries follow the data in looped chains to find the requested information. While the network data model essentially eliminates the above difficulties of the hierarchical model, a major problem of this approach is the complexity of the database designs that typically result. Normalization difficulties occur with the network approach as well, which will be explained below in connection with the relational model.

A relational database consists of a series of tables, each table being composed of records of a certain type. The intuitiveness and simplicity of the relational model are immediately apparent. These characteristics give the relational model much of its appeal. Most of the important commercially available microcomputer database management systems at the present time are relational databases. One aspect of this model is the complete absence of explicit links between record occurences. This is both a significant strength of relational database management systems because it allows very simple and powerful query languages, and a significant weakness, because it makes relational database management systems notably slow. However, the generality of the model and the increased ease of producing both database designs and query procedures have made the relational model the most popular for recent database management systems.

An area of concern with relational database management systems is normalization. Normalization refers to the degree of semantic correctness in the database design. Consider a simple relational database having only one relation, i.e., Person. The fields of the relation are the person's name, street address, zip code, and child. This is satisfactory as long as the person has only one child. However, the real world situation of more than one child can be handled only by adding another complete instance of relation, with all the fields the same except for the child field. This means that the database is not normalized. The problem with this example is solved by splitting the Person relation into two relations: PersonAddr and PersonKidz. This solves the normalization problem, but creates a new database. Construction of the new database requires enumeration of the entire database, splitting each relation into its new pieces, and even for a simple data model, this can be very expensive in time and storage space.

The lack of normalization, though obvious in the above example, can be subtle in many database applications. Detecting a lack of normalization depends on the database designer's degree of understanding of issues involved in normalization and his or her familiarity with the material to be represented in the database. The degree of difficulty of modifying a relational database after its structure has been redesigned makes what seems like a simple change, adding information to what is already there, a process of creating a new database, into which the contents of the old database are dumped.

A variant of the relational model, called the binary relational model, breaks down the information in the database into the smallest possible pieces at the outset, to avoid normalization problems. This model has two fields: a key and an attribute. The key is used for retrieval and may be called an entity name. When a value is placed in an attribute value field, the result is a data model having entity-attribute-value triples. This model is called the entity-attribute model, and the present invention concerns improvements in that model.

The Entity-Attribute data model has many variants, and there are many systems in use which employ some form of it. Even the LISP programming language has a feature—property lists—which exhibits the fundamental characteristics of an Entity-Attribute system, although the terminology is different. Much of the recent work in the field of Artifical Intelligence has been in developing "knowledge representation languages" in order to encode general knowledge and facts for "expert systems". Knowledge representation languages and systems have proven the descriptive power of the Entity-Attribute or similar models. However, these systems address the needs of programmers and "knowledge engineers" rather than everyday users. The need for a truly simple user view into a database is as urgent as the need for database flexibility and representational power.

Relational model databases abound also. These systems organize data into tables or "mathematical" relations. Unfortunately, the mathematics of relations escapes most everyday users of databases, and the quest for ease-of-use amounts to little more than a tradeoff between representational power and simplicity. For example, relational systems for everyday users rarely allow true relational joins, and many can only use a single table at a time, even though the representational utility of the model fundamentally relies on ability to decompose relations into multiple "normalized" relations.

Idea processors have a superficial similarity to the Item Editor, in that they allow what appears to be highly flexible data structuring. In reality, however, these systems are not databases at all, since they enforce no formal semantics, at least as "understood" by the idea processor. Instead, they merely serve as indexing methods for collections of "snippets" of text, or, even more simply, as improved text editors which can selectively hide certain levels in a user-defined "outline" hierarchy.

The value-ordered one-row-per-Attribute display, or "Item Editor", allows everyday users to construct and edit fully general Entity-Attribute databases in much the same way as they would edit text using modern word processors. In fact, an Item Editor scrolls the display "window" up and down over the sequence of Items like a word processor scrolls the display window up and down over a document. The person perusing and editing the single sequence of Items in an Item Editor has a single, uniform visual image to contend with, either through the display or on paper—this contrasts with the non-visual, abstract, inquiry—or view-dependent concept of a database with which relational DBMS programmers and database administrators are familiar.

SUMMARY OF THE INVENTION

Accordingly, it is an object of this invention to provide a database interface, management system and engine in which access to data in the database occurs more rapidly than in prior art database interfaces, management systems and engines.

It is another object of the invention to provide such a database interface, management system and engine which matches well with the conceptual structures and processes that people ordinarly use when organizing and analyzing a body of information.

It is a further object of the invention to provide such a database interface, management system and engine which allows new types of information to be entered in a database created with the system without requiring the creation of a new database.

It is yet another object of the invention to provide such a database interface, management system and engine in which normalization is not required.

It is still another object of the invention to provide such a database interface, management system and engine which is free of insertion/deletion anomalies.

It is a still further object of the invention to provide such a database interface, management system and engine which utilize an improved B-tree algorithm and special data structures to provide improved performance, storage efficiency and reliability.

It is another object of the invention to provide such a database interface, management system and engine which is fast enough in operation to allow use of a single access method to the data in the database.

It is a further object of the invention to provide a user interface to a database management system that allows the user to "thumb through" data in the database.

It is yet another object of the invention to provide such a user interface which allows the user to navigate in the data in an improved manner.

It is a still further object of the invention to provide such a database interface, management system and engine which provides improved consistency through the use of inversion.

The attainment of these and related objects may be achieved through use of the novel database interface, management system and engine herein disclosed. A user interface for a database management system in accordance with the invention has an interactive display means configured to present magnitude ordered information from the database in a plurality of rows. A means is provided for storing the information. A circuit means is connected between the storing means and the interactive display means to provide information signals to the interactive display means for displaying the information to the user. The information signal providing circuit means is configured to cause the interactive display means to display the information in magnitude ordered rows comprising a set of items. Each row is an assertion consisting of a plurality of components including an entity, an attribute and a value of the attribute, arranged in that fixed order in decreasing significance, respectively. A user input means is connected and configured to select information from said storage means for display on said interactive display means.

A database managment system in accordance with the invention has a means for storing information as a magnitude ordered set of items. Each item is an assertion consisting of a plurality of components including an entity, an attribute and a value of said attribute arranged in that fixed order in decreasing significance, respectively. A circuit means is connected to supply and receive information signals from and to the storing means.

An information processor is connected to supply and receive the information signals from the circuit means.

A database engine in accordance with the invention is a data storage and retrieval system having a secondary, direct-access, non-volatile, storage means, configured to store and retrieve data in fixed-length units. The engine has a primary random-access, high-speed storage means. A cache, direct-access, high-speed storage means is configured to store and retrieve data in the fixed length units. A computing means communicates with the secondary storage means, the primary storage means and the cache storage means. The computing means is configured to create a basic index in the form of a tree structure. Nodes of the basic tree index are the fixed length units stored in the secondary memory. Branches of the tree are addresses of such fixed length units. The basic tree index provides key-sequence access or random access by key to data stored in the secondary storage means. The computing means is further configured to carry out a meta access method providing random-access by key and key-sequential access to data stored in the cache. The data is stored in the cache in the form of the fixed length units of data as stored in the secondary storage means, and in the form of fixed length units of the basic tree which reside in copies of the fixed length units of data as stored in the secondary storage means. Each such copy or modified copy of the fixed length units of data in the cache are accessable with the meta accessing method by key values in a range of key values belonging to each such copy or modified copy of the fixed length units. Such range of key values belonging to each such copy or modified copy are a set of key values for which access of the basic tree index depends on the contents of such copy or modified copy.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a block diagram of a database management system in accordance with the invention.

FIG. 2 is a table comparing parameters of the invention with the prior art.

FIG. 3 is a table showing component encoding in a database management system in accordance with the invention.

DETAILED DESCRIPTION OF THE INVENTION

Figure 4:
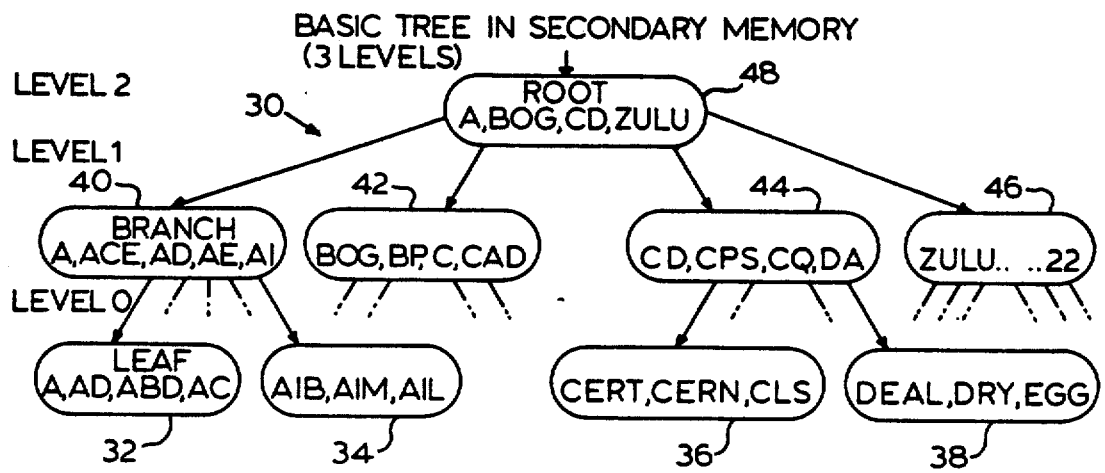
FIG. 4 is a block diagram of a data tree used in a database engine in accordance with the invention.

Turning now to the drawings, more particularly to FIG. 1, there is shown a database management system 10 in accordance with the invention. The database management system 10 includes a database engine layer 12, a representation layer 14 above the engine layer 12, a consistency layer 16 above the representation layer 14, and a presentation layer 18 above the consistency layer 16. The presentation layer 18 provides the direct user interface to the system 10 and also contains any applications software adapting the database management system to particular uses. The consistency layer 16 maintains agreement or consistency between items in the database, through the use of inversion, classification and generalization. The representation layer 14 handles the encoding of components of items in the database. The database engine layer 12 provides keyed data storage and retrieval on disk or disk file. It also performs access and updates of data in the database. The four layers 18-12 in the database management system 10 will be described below in further detail from the top down, i.e., from the presentation layer 18 to the database engine layer 12.

Before describing the invention further, there are certain terms that will be used in the description, which are defined in the following glossary section:

IMPLEMENTATION-LEVEL CONCEPTS (For programmers)

B-Tree

A B-Tree is an efficient structure for data sorting, storage and retrieval on direct access storage devices such as magnetic disk. Conventional B-Trees provide access of a record of data based on a key. The key names the record and determines the order of records in the database. In Infinity, there is no record part in a B-Tree entry, and the data is stored with the key. Since the distinction between name and data is blurred, the term "key" is misleading, and we replace it with the term "Item." The "key" part of an Item is at the left end, while the "data" part is at the right. The "key"/'-'data" boundary depends on characteristics of the stored information.

Item

An Item is a contiguous string of characters from 0 to 99 bytes in length which is stored in the Infinity B-Tree. The B-Tree stores Items in ascending order, according to the binary value of the bytes of the Items, with most significant byte first. This rule is similar to that for the alphabetization of words. A single Item is normally used for storing a single, independent fact. An Item is the smallest piece of information that can be changed or retrieved in one operation by the Infinity B-Tree.

Cursor

A Cursor is 100 contiguous RAM memory bytes which are used for storing one Item. The first byte is dedicated to storing the length of the Item contained in the Cursor. The other 99 bytes are for storing the Item itself. A Cursor is used by a program as a moving "pointer" into the sorted sequence of Items in the B-Tree. Cursors are modified by the B-Tree retrieval or "Cursor moving" functions First, Next, Last, and Previous. A Cursor is required for the B-Tree modification functions Insert and Delete.

Prefix Compression

The Infinity B-Tree efficiently stores Items having identical prefixes; this is called "Identical Prefix Compression" or just "Prefix Compression." If a given set of 1000 Items begin with the same 40 bytes, the storage required is almost 40,000 bytes less with Prefix Compression than without it. Users of the B-Tree are unaware of Prefix Compression except as it affects storage requirements.

The data organization used by Infinity is dependent on Prefix Compression. Without it, Infinity databases would grow in memory requirements by perhaps an order of magnitude.

ASSERTION-LEVEL CONCEPTS (For Users)

GRAMMAR-LEVEL CONCEPTS

Assertion

Fact or Statement

An Assertion is like a simple declarative sentence in a natural language. It states a single fact. Hence the concepts in this section all have grammatical analogues. Grammatical synonyms appear parenthesised, after each applicable Infinity term. An Infinity database is a set of Assertions.

Assertions have three Components: EntityName, AttributeName, and Value. The Value Component actually can be more than one Component; it is defined as the third through last Components. The Value may also be empty. Multi-Component values are uncommon but important in certain situations.

Most Assertions require one Item for storage. Longer Assertions may be broken down into multiple Items according to the ItemChaining rules.

Component

Noun-Phrase or Verb-Phrase

Each Assertion is composed of a concatenated string of Components. The Components are identified by scanning over them one-by-one from the beginning (left end) of the Assertion. Thus each Component must delimit itself in some way. By default, Components are constructed according to the universal Component rules, which provide a simple delimiting and scanning method. However, the Infinity programmer may define SpecialComponent rules using different delimiting and scanning methods. SpecialComponent rules are normally used only for Values.

EntityName (Subject)

The first Component of an Assertion.

AttributeName

Verb

The second Component of an Assertion.

Value (Object)

The third through last Components of an Assertion. May be empty.

Attribute or Property

Predicate

The second through last Components of an Assertion. Includes AttributeName and Value, if any.

MODEL-LEVEL CONCEPTS (For Users)

Entity-Attribute Model

The EA model is the set of data organization rules followed by Infinity and documented in this glossary. The world is thought of as a collection of distinct Entities, each of which has a set of distinct Attributes. There are no limits on the number of Entities or on the number of Attributes for any Entity. Attributes are in turn broken down into AttributeNames and Values. Since a Value may be the EntityName of another Entity, Entities may refer to each other and form Connections. Inter-Entity references are normally mutual; this mutuality is called Inversion. The AttributeNames occurring in the mutual references are Inverses, and are permanently associated. No AttributeNames other than defined Inverses are ever used in a mutual reference.

Whenever a new Value is attached to an Entity, the AttributeName it is attached by is looked up for a possible Inverse. If an Inverse is found, another attachment is made, this time with the Value becoming the EntityName and the original EntityName becoming the Value. Conversely, whenever a Value is detached from an Entity, the Attribute is looked up for an inverse, and if found, the inverse is detached as well.

Entity

An Entity can be any object, idea, person, quantity, or other thing. Each Entity is defined by a set of Assertions (Facts or Statements) which have the same EntityNames (Subjects). A database in Infinity is composed of a set of Entities and their Attributes.

Infinity is useful for representing any kind of data which can be thought of in some way as a "network" or "graph" of nodes (Entities) and arcs (Connections). This includes all tabular data, such as that stored in Relational databases.

Examples of Entities are: a certain person; a person's name; a person's social security number; A certain train; an invoice; a type of animal; an electrical connection; a word; a paragraph; or a topic of a book.

Most entities have convenient names that people use to talk about them. Many do not, though, and are referred to indirectly by using more conveniently named Entities. In Infinity, we give all Entities an "EntityName", although many will be "internal"—i.e. meaningful only to Infinity.

Attribute

An Attribute is a "Property" or "Characteristic" of an Entity. Examples of Attributes are: the child of a person; the length of a road; the type of an Entity; or the color of a car. (It is no accident that we use the "the x of a y" phraseology. Most natural languages use the Entity-Attribute model extensively, as exemplified by the existence of possesives, the genitive case in some languages, and many property-related pronouns.)

In Infinity, Attributes have simple names called "AttributeNames." which are mostly less than 8 characters long for convenience, and are without imbedded spaces. The first letter of each word in a name is capitalized in order to keep the words separate after the spaces have been removed. This is only a convention—there are no actual limits on AttributeNames .

BINARY RELATIONS (Background Information)

Connection

A Connection is a joining together of two Entities. Every connection is an instance of a particular Connection type, called a Binary Relation. A single connection corresponds to two Assertions which are Inverses in the EA model.

Binary Relation

A binary relation is a type of Connection. It is set of Connections each of which serve a similar purpose. A single Binary Relation corresponds to two Attributes which are Inverses in the EA model.

Asymmetrical Binary Relations

Most Binary Relations are asymmetrical; the two connected Entities in any one Connection play different "roles" Examples are: the parent/child relation; the property/owner relation; or the supplier/purchaser relation. The slash separates the EA model Inverse AttributeNames in each of these examples.

Symmetrical Binary Relations

Many Binary Relations are symmetrical; the two connected Entities play indistinguishable roles. Examples of symmetrical Binary Relations include: Electrical circuit "arcs" which connect pairs of "nodes;" chemical plant pipes which connect pairs of "joints" such as tees; and automobile roadways which connect intersections. We tend to think of symmetrical binary relations as defining networks of some kind, although simpler structures can be symmetrical as well.

Entity-Relation Model

The ER model is a variant of the EA model which replaces invertable Attributes with Binary Relations. The two models have equal expressive power.

Binary Relational Model

Is a fully-normalized Relational Model.

THE RELATIONAL MODEL (Background Information)

The relational model is currently the most popular database model. In it, data is organized into tabular form, and tables are related via "relational joins", which create new virtual or actual tables.

The relational model gained significant theoretical popularity when it was shown to be better than the CODASYL Network model of 1960's vintage. It gained significant programmer popularity when programmers realized that it fit in well with the ubiquitous "flat" file structure supported by the file system of nearly every modern operating system.

A process called normalization is used to help in determining the proper breakdown of data into tables. The process depends on "functional dependencies" in the data, which must be known in advance. Normalization points out problems such as "Insertion/Deletion Anomalies" in a particular table structure and suggests a way to break down the table into smaller tables (with fewer columns in each). The normalization process continues, further breaking down the tables, until no more problems are found.

The normalization process is so difficult for most users to understand that there are almost no correctly normalized relational databases in use. Furthermore, normalization usually calls for an unacceptably inefficient and logically scattered structure consisting of many small tables. As a result, many users must deal with mysterious conceptual problems that arise from an incorrect choice of table structure.

The Entity-Attribute model corresponds to a maximally normalized relational model, hence there is no more normalization required, or even possible. No "Insertion/Deletion Anomalies" or other problems exist. No change in the "Functional Dependencies" in the data after the database is created can require a change in the structure of the database.

The relational model also has difficulties (which may usually be overcome) in representing data that does not fit into tabular form, such as: text; multi-valued fields; null-valued fields; sparse tables; symmetrical relations; long sequences; and recursive structures such as trees.

THE DATABASE MANAGEMENT SYSTEM

The system is a fast, concurrent DBMS for IBM PC compatibles which uses an "Entity-Attribute" data model to achieve high flexibility. In the following description, the database management system of this invention is often referred to as "Infinity." Infinity eliminates most of the finiteness of a conventional DBMS; the table of FIG. 2 compares some key parameters of Infinity with those of typical relational DBMS's. Column 20 of the table lists the parameters being compared. Column 22 shows the characteristics of the database management system of this invention, referred to as "Infinity Entity-Attribute." From the characteristics of many of the parameters and the description of the invention, the origin of the name should be apparent. Column 24 shows the corresponding characteristics of a typical relational database management system.

In Infinity, all information is stored in one logical space as a set of 'Entities' which each have an unlimited number of 'Attributes' to relate them. Entities and Attributes can be created and deleted dynamically and in any order with no wasted space or time-consuming compactions or structure redefinitions required. The 'EA' model is quite natural and simple to most people and yet is actually more descriptive than the Relational model. Furthermore, the EA model has no need for the complex mathematical procedure called 'Normalization', which splits up Relations and scatters relevant data over multiple smaller Relations in order to avoid 'Insertion and Deletion Anomalies' and other still poorly understood problems.

The Entity-Attribute model is ideal for interactive use. Entities can be created or deleted without need for identifying their kind-or structure in advance. Attributes can be attached to one another, forming a 'Binary Connection' (or 'Inter-Node Arc', or 'Link'.)

Because they have such a uniform structure, Entity-Attribute databases may be merged together more easily than most other types. This feature makes EA databases suitable for interchange between independent or networked personal computers in much the same way as text files are interchanged. Infinity provides a simple standard for representing and transmitting such data.

ITEM EDITOR USER INTERFACE

A look at the Infinity ItemEditor will help understand the Infinity EA model. A general purpose tool for editing Infinity databases, the ItemEditor is a full-screen, interactive window into a sorted list of 'Items'. An Item contains an EntityName at the left, an AttributeName in the middle, and an AttributeValue at the right; all are connected by underlines. An ItemEditor window into a name-and-address database might show:

---

Johnson, D.__city__San Francisco
Johnson, D.__state__CA

-continued

```
Johnson, D.__street__483 W Chestnut
Johnson, D.__phone__(415) 555-2838
Johnson, D.__phone__(415) 555-2839
Johnson, D.__phone__(415) 555-7001
Johnson, D.__parent__Smith, D.
Johnson, D.__zip__93401
Smith, A.__phone__(805) 838-2803
Smith, D.__child__Johnson, D.
Zimmerman, R.__phone__(213) 388-9665
```

Johnson has three phone numbers, and Smith and Zimmerman have no addresses. No space is wasted for Smith or Zimmerman's unknown addresses, yet they can be added at any time. The 'parent' and 'child' AttributeNames are of Smith. The repetitions of Smiths' and Johnson's names and Johnson's 'phone' AttributeName can be suppressed on the display if desired:

```
Johnson, D.__city__San Francisco
         state__CA
         street__483 W Chestnut
         phone__(415) 555-2838
                (415) 555-2839
                (415) 555-7001
         parent   Smith, D.
         zip      93401
Smith, D.__phone__(805) 838-2803
         child__Johnson, D.
Zimmerman, R.__phone__(213) 388-9665
```

In this way, the list of Items can be viewed as a list of non-redundant EntityNames, attached to non-redundant AttributeNames, attached to a list of AttributeValues. This "Entity-centered" view cannot be achieved with a relational system, which requires that information relating to, say Johnson, be distributed among many relations in which Johnson is a (partial) key.

The Item Editor provides a highlighted Edit Line which is used to "thumb" through the database. Rather than constructing command lines and waiting for search operations to complete, the user can employ familiar typing and editing conventions to fill out the edit line. By typing into this line or using CTRL characters to auto-fill it, users control which portion of the database is in view. At all times the display of items dynamically adjusts to show items which alphabetically follow the contents of the edit line.

When the highlighted area is empty, the first item in the database is displayed beneath it, followed by the second item, etc. The user might type "Tho" causing the item that is after "Tho" alphabetically to appear beneath the edit line, such as:

```
Thorson, Jack M.__city__San Francisco
```

Without knowing the exact spelling of a particular item, or, without knowing for sure whether an object is even in the database, the user can browse rapidly without instituting formal, time-consuming searches.

Users construct new items for insertion into the database by typing and correcting freely, within the edit line. Once constructed, the item is inserted with one keystroke (the Ins key on the IBM PC.)

When deleting an existing item, the up and down arrow keys provide an easy way to stuff the edit line with the exact contents of the item to be deleted. Then the item can be removed from the database in one keystroke (Del on the IBM PC.)

Navigating, or doing a long vertical hop through the database, is performed using the "Invert" key. This key automatically modifies the edit line so that it contains the "Inverse" of its previous contents, and the rest of the screen adjusts to follow. An Inverse is obtained by interchanging the EntityName with the AttributeValue, and changing the AttributeName to its defined Inverse AttributeName. Thus if "parent" is the inverse of "child", then the inverse of:

```
Smith, D.__child__Johnson, D.
is
Johnson, D.__parent__Smith, D.
```

The inverse of every Item inserted or deleted is automatically inserted or deleted as well. The user defines the inverse of an Attribute by Inserting an Item like:

```
parent__Inverse__child
```

Item Editor "Power Tools"

In addition to the single-Item-at-a-time editing facilities provided by the Item Editor, the interactive user will want to occasionally apply "power tools", which generally affect more than just one Item and its inverse. Power tools correspond to the inquiry languages of other systems, but go beyond inquiry languages in that they can be used during the process of creating and editing the formal structure of the database, while inquiry languages require well-defined formalisms. Power tools are not "smart"; they don't "know" about the meaning of the data.

Some examples of power tools are:

(1) Change the name of a given Entity in every Item in which it occurs in the database;

(2) Search the Entity Names, Attribute Names, Attribute Values, or a combination of these for a given pattern of characters, such as is possible in many text editors. This is a "fuzzy" type of match like that in text editors;

(3) Make inferences of certian kinds. For example, joining the two binary relations represented by two Attribute Names constitutes a kind of immediate inference;

(4) Perform set operations on the sets of Attribute Values attached to a given Attribute Name on a given Entity;

(5) Perform set operations on the sets of Items in different databases. A simple union of the sets of Items of databases having compatible structures constitutes a merging of the databases. Compatibility between databases means (a) there are no synonyms or aliases—the same Entity Names identify the same Entities (this includes Attribute Names, which occur as Entity Names in some Items); (b) there are no name collisions—different Entities have different Entity Names; (c) they were created with a common understanding of the intrinsic meaning of those Attribute Names which occur in both databases; and (c) they adhere to a common set of consistency rules.

(6) Check the logical consistency or acceptability of a database or part of it by testing according to rules defined within the database itself. Such rules could be organized in the simple "if-then" pattern matching structure of productions.

Periodic Publishing as an Informally Distributed Database

Most power tools would not be useful in a multi-user environment where real-time updates to a database are immediately shared with other users. In such situations, the ideas of locking, transactions, commitment, logs, and so on come into play. But there are many database jobs which can be done off-line, in a one-user-per-database mode, with periodic "publications" of the database or its changes.

Local Area Networks and Electronic Mail make the regularly published database idea particularly attractive. Individual users of Item Editors with power tools can create and maintain individual databases which can then be published via the electronic mail and automatically merged into the databases of other interested users. Most electronic mail systems support the concept of "distribution lists", whereby users may register their interests and recieve only the kinds of mail that they want. Thus a publication of an update of a certain database can go out to a certain distribution list of users automatically. If the publications are frequent, each user will feel as though his or her personal database is on-line.

It is not necessary that only one user maintain an entire database. Several users can contribute updates which are merged by a third, checked for consistency and accuracy, and then published, perhaps ending up back in the databases of the contributors.

All of this is similar to what is presently done with text files. However, text files must always be manually edited if they are to be meaningfully merged. Entity-Attribute Item Spaces, on the other hand, can be meaningfully merged without further editing, so long as a few compatability arrangements are made beforehand by the database creators. While the application of the power tools should always be able to bring a pair of databases eventually into compatible forms, the disparity will diminish as the level of formality and standardization of the database structures increases. Entity-Attribute Item Spaces can move about on the formal-informal continuum.

CONCURRENT B-TREE IMPLEMENTATION

Infinity requires only a single supporting data structure: a B-Tree with efficient variable-length keys and common-prefix compression. No traditional file structures are used, so Infinity is file system independent. Infinity can use as its media either an entire disk drive or a single, contiguous, random-access file. (In principle multiple files or disks can be 'spanned' as well.) When used with a disk directly, performance is enhanced due to both the elimination of conventional file system overhead and the possibility of using head motion optimization, concurrent (DMA) I/O, and other features.

The Infinity B-Tree is written in assembly language for maximum performance. The implementation makes a minimum of assumptions about the operating system and hardware configuration, so the design of Infinity is extremely portable. It is even suitable for hardware speedups or 'casting in silicon' and was written with an eventual back-end processor in mind. But the most important speed feature is concurrency: multiple processes may access the B-Tree without the page faults of one process causing delays for another.

The Reliability features in Infinity may be of more importance to many users than the speed. Infinity uses a proprietary index update protocol to insure that power failures or other catastrophes will never leave a database in an internally inconsistent state. Only the most recently Inserted, "uncommitted" Items may be lost. The extensive internal validity checking is user-invokeable, one time or on every I/O.

CONSISTENCY LAYER

The Consistency Layer of Infinity is supported by the Representation and Engine Layers, described below.

Infinity Layers

This section discusses the built-in rules that the Consistency Layer applies to an Infinity database in order to maintain agreement or consistency between more than one item or assertion. In particular, inversion, classification, and generalization each organize multiple items into distributed structures which make the same information available in several places. If such item structures are allowed to fall out of agreement, or be inconsistent, the results are unpredictable or incorrect, and will depend on how the database is accessed.

The built-in rules are not guaranteed to fulfill all consistency requirements of all possible databases; in fact, applications programs or other parts of the Presentation Layer above will commonly enforce their own additional consistency rules, based on a deeper understanding of the entities being represented. The built-in rules do, however, provide a certain amount of enforced agreement between variants of the Presentation Layer in order to maximize inter-application compatibility.

Inversion

The most fundamental consistency constraint for the Entity-Attribute Model is inversion. Inversion provides a symmetrical representation for each entity-to-entity connection, even though the entity-attribute format asymmetrically forces one of the entities to be thought of as an attribute of the other.

Symmetry is achieved by duplicating the connection, with each entity attached as an attribute of the other in turn. With such an inverted connection, either entity can be looked up in order to find out the other.

The symmetrical representation now requires an indication of the direction of the connection, or else the direction information will be lost. Two common ways of doing this are used in entity-attribute models: (1) the connection type is named with a single name and the direction is designated separately; or (2) the connection type has two names, one used for each direction. Infinity uses the latter method. In the former, the "backward" direction is often indicated by suffixing "of" to the attribute name for the "forward" direction. However, the "forward/backward" idea is still representationally asymmetrical, and is an unnecessary complication. Furthermore, there is often a need for an undirected connection; the "forward/backward" designation must disappear. In Infinity, undirected connections are simply given the same attribute name for both directions. Following are some examples of inversions.

An Inverted Directed Connection

-continued

```
Dobbs, J.__has child__Dobbs, M.
Dobbs, M.__has parent__Dobbs, J.
```

An Inverted Undirected Connection

```
Dobbs, J.__dances with__Dobbs, M.
Dobbs, M.__dances with__Dobbs, J.
```

The "Inverse" Attribute

Defining two attribute names as inverses is done by connecting them together via the "inverse" attribute. In order to define that the "has child" attribute is the inverse of the "has parent" attribute, one inserts the item:

```
has child__inverse__has parent
```

Now, this item has an inverse as well:

```
has parent__inverse__has child
```

In other words, the inverse attribute is its own inverse, and it is undirected. The fact that inverse is its own inverse is reflected in the item:

```
inverse__inverse__inverse
```

The mandatory existence of this unique item is a consistency rule.

Consistency Rules for Inversions

1. The inverse__inverse__inverse item is permanent.
2. An item "X__A__Y" must have an inverse "Y__B__X" in the database if and only if there is an item "A__inverse __B" that defines the inverse attribute "B."

Note that it is not necessary for every attribute to have an inverse.

Classification

Built on top of inversion are several structures, the most fundamental one being classification. A class is a set of entities which share some qualities. A class differs from a set in that a class can have only entities as members, whereas a set can have anything as a member, including other sets which may be vaguely defined or even infinite. Of course, it is always possible to define a new entity to represent any particular set, but this is not necessary in the pure set domain.

In Infinity, the name of a class, such as "person," is an entity which can participate in connections with other entities. Thus "person" can have attributes just like any other entity. The special attributes "is a," and "has example" are inverses, and are very important, since they connect the class to the entities that are in it. Since our previous examples showed two people, they would both be in the "person" class:

```
Dobbs, J.__is a__person
Dobbs, M.__is a__person
Person__has example__Dobbs, J.
Person__has example__Dobbs, M.
```

It is possible to find examples of a class given the class name, or to find the class name of an entity given its entity name. Note that an entity may be in more than one class.

Classes themselves are entities in the special class "class." The class "person" is defined by being an example of the class "class:"

```
class__has example__person
person__is a__class
```

The class "class" is an example of itself:

```
class__is a__class
class__has example__class
```

Consistency Rules for Classes

1. The item "is a__inverse has example" and its inverse are permanent.
2. The item "class__is a__class", and its inverse, are permanent.
3. An item "X__is a__Y" (or "Y__has example__X") may exist if and only if "Y__is a__class" exists. (Only classes may have examples.)
4. An Item "X__A__Y" may exist if and only if an item "X__is a__Y" exists. (Every entity must be in at least one class.)
5. An item "X__A__Y" may exist if and only if "A__is a__attribute" exists.

Rule 2 establishes the class "class" which has all of the classes in the database as examples. Thus all the classes may be enumerated easily.

Rule 3 insures that only classes may have examples. The "is a" attribute may have only a class name as its value.

Rule 4 insures that every entity is in at least one class. This is an important constraint, since it guarantees that all entities may be found via the "has example" attribute for some class; no entities are "free floating."

Rule 5 maintains a class of attributes, so that all the attributes may be enumerated easily.

Generalization

A class which must necessarily include every member of another class can be considered as the "more general" or as a generalization of the other class, which is a specialization of it. This situation can be indicated by the "contains/contained by" attributes:

```
animal__contains__person
person__contained by__animal
```

"Contains" and "contained by" may be read "has subset" and "has superset," or "has subclass" and "has superclass." Another way to read this is "Every person is an animal." Or, "For every X, if X is a person, then X is an animal." Thus the "contains" attribute permits the expression of one type of categorical sentence and the logic of categorical sentences (syllogism and so on) can be used to make inferences.

Another kind of categorical sentence is the negative of the kind we have just seen. For example, the negative of "every person is an animal" is "For every X, if X is a person, then X is not an animal." (We are using the term negative in the sense used in the logic of categorical sentences.) The negative can be expressed using "contains no." Since no person is an inanimate object, we could say:

```
person__contains no__inanimate object
inanimate object__contains no__person
```

Note that "contains no" is undirected (it is its own inverse.) Naturally, it is not common to assert both the affirmative and the negative forms of the same categorical sentence at the same time, i.e. that "X__contains__Y" and that "X__contains no__Y," because there would necessarily be no Y's, in which case there may as well not be a class for Y's. The database will usually have only one or the other form relating the same two classes at a particular time, but it is not necessarily so.

Both of the above types of categorical sentence are universal in that they apply to every element of a class. Another type is the particular categorical sentence, which applies only to some element of a class. An example is "Some person is a burglar," (which we might presumeably know because burglaries exist), or "There exists an X such that: X is a person and X is a burglar." This can be expressed in Infinity as follows:

```
person__contains a__burglar
burglar__contains a__person
```

Note that "contains a," like "contains no," is undirected. Also note that "contains a" is still true if there are more than one "contained" example; it could have been called "contains at least one."

The negative of the above would be "Some person is not a burglar," or "There exists an X such that: X is a person and X is not a burglar." This can be expressed with:

```
person__contains a non__burglar
burglar__contains at most part of__person
```

Note that the same effect could be obtained if the negative of the right hand class were available: "person__contains a__non burglar." However, negative classes will normally not be available because they are too large: a negative class would contain the entire rest of the database. Further note that "X__contains a non__Y" does not imply "X__contains__Y" and also that it is possible that both "X__contains a non__Y" and "Y__contains a non__X." Lastly, note that there is no implication that the example asserted to exist must be in the database. We might know that some burglar exists without knowing the burglar's identity.

In the logic of categorical sentences, contradictories are sentences which cannot both be true or both be false. Contradictories are exactly opposites. The contradictories in Infinity can be summarized as follows:

X__contains__Y contradicts X__contains at most part of__Y

X__contained by__Y contradicts X__contains a non__Y

X__contains a__Y contradicts X__contains no__Y

The concepts of contraries and subcontraries from the logic of categorical sentences do not apply in Infinity since we adopt the hypothetical point of view, which, in contrast to the existential point of view, does not presuppose that each class must contain at least one entity.

A non-categorical but useful concept from the set domain is that of proper subset, which is indicated by "contains morethan/contains less than:"

```
person__contains more than__burglar
burglar__contains less than__person
```

Note that "X__contains morethan__Y" implies "X__contains__Y" and "X__contains a non__Y."

Optimizations for Generalizations

Contains is a transitive relation, which means that if "A__contains__B" and "B__contains__C" then "A__contains__C" (and similarly with "contained by.") Some or all of the connections transitively derivable may actually exist in the database. It is possible to "fill-in" the generalizations or specializations for a class so that the full transitive closure of the "contains" (or "contained by") attribute is explicit: this can be a great speed advantage. Normally, the generalizations and specializations will be inferred as needed.

Another space saving is the upwards propagation of examples. If an entity is an example of a class, then it must be an example of all generalizations of the class as well. Thus it is necessary to assert explicitly the membership of an entity only in the most specific classes. Membership in the more general classes can be inferred automatically or, to eliminate the delay of inference, be "filled-in" or made explicit.

Consistency Rules for Generalizations

These rules are concerned only with contains, since it defines the generalization hierarchy. For efficiency, contains is always explicit, even when it is implied by "contains more than."

1. The item "entity__is a__class" is permanent. (However, not all entities need be explicitly examples of the "entity" class.)
2. No item "entity__contained by__X" exists. ("Entity" is the most general class.)
3. An item "X__contained by__Y" or "Y__contains__X" can exist if and only if:
    a. "X__is a class" and "Y__is a class" exist, and
    b. "X__contains+__Y" does not exist, where "contains+" represents the transitive closure of the "contains" attribute.

Traits

Analogous to the upwards propagation of examples is the downwards propagation of traits through inheritance. A trait can be any quality defined to be possessed by a class. A class can inherit traits from any of its direct or indirect superclasses (any class that contains it). Thus a trait of the class "animal" would be a trait of the class "person," given that "animal contains person." A trait of the class "class," which is the most general, is inherited by all classes.

The "Attribute Of" Trait

The "attribute of/has attribute" trait describes the appropriateness of using a given attribute with an entity of a given class. "Parent__has attribute__animal" is an example which says that only animals can meaningfully have parents. "Has attribute__attribute of__class" indicates that "has attribute" can be attached only to classes. "Attribute of_attribute of_attribute" indicates that "attribute of" can be attached only to attributes. Since "attribute of" is a trait, it applies to all the direct or indirect subclasses of any class to which it is directly attached.

```
child of_attribute of_animal
parent of_attribute of_animal
```

"Child of" and "parent of" apply, then, also to persons and burglars, which may have parents and children. But "attribute of" can be applied to the built-in attributes as well, in order to keep the database consistent at this low and very important level:

```
attribute of_attribute of_attribute
inverse_attribute of_attribute
is a_attribute of_entity
has example_attribute of_class
contains_attribute of_class
contained by_attribute of_class
contains no_attribute of_class
contains a_attribute of_class
contains a non_attribute of_class
contains at most part of_attribute of_class
contains more than_attribute of_class
contains less than_attribute of_class
has attribute_attribute of_class
```

The inverses of these assertions are (with prefixes supressed):

```
attribute_has attribute_inverse
                          attribute of
entity_has attribute_is a
class_has attribute_has example
                          contains
                          contained by
                          contains no
                          contains a
                          contains a non
                          contains at most
                          part of
                          contains more than
                          contains less than
                          has attribute
```

"Attribute of/has attribute" can be used either to verify the consistency of an existing database or to help a user in creating a new database. If a user is unfamiliar with the structure of the database but wishes to add a new entity, only the class of the entity need be defined in order for the system to provide a "template" or "checklist" of attribute names which might apply. These attribute names will normally be self-descriptive, but the user can of course examine the definitions of any of them, especially their "attribute of's" and "description's."

The "Unique Attribute" Class

Many attributes really cannot be used with multiple values on the same entity. In other words, two items of the form "X_A_Y" and "X_A_Z" cannot both exist in the database at once. For example, the "has mother" and "has father"attributes of a person must be unique. Such attributes are placed in a special subclass of attribute called "unique attribute":

```
has mother_inverse_mother of
has father_inverse_father of
has mother_is a_attribute
                       unique attribute
has father_is a_attribute
                       unique attribute
unique attribute_contained by_attribute
```

"Mother of" and "father of" are not unique attributes. The only built-in unique attribute is inverse.

```
inverse_is a_attribute
                 unique attribute
```

Note that although all unique attributes are also attributes, we normally explicitly indicate this fact using both "X_is a_unique attribute" and "X_is a_attribute."

THE REPRESENTATION LAYER

The Representation Layer of Infinity is supported by the Engine Layer, described below. The Representation Layer is mainly the encoding of components of items.

Component Encoding

Three main types of components or data elements are used in items: symbolic, binary, and decimal. These may each be used in a variety of ways that determine their exact interpretations. However, each has a default interpretation used by the Item Editor. Although the Item Editor may misinterpret components which have been used in a non-default way, the Item Editor user will not normally modify or use these components since they are normally created and used by an application program.

Parsing Components

Each Component of an item in a cursor can be parsed by a simple rule to find its end. The rule is as follows.
1. Check that we are not at the end of the cursor already.
2. Look up the first byte in a table called ComponentLenTab.
3. Add the table entry to the offset into the cursor in order to skip over the fixed portion of the component.
4. Place a 255 sentinel byte after the last byte of the Cursor.
5. Skip over the variable part of the component by skipping bytes greater than or equal to 128.

This rule is extremely fast, yet allows considerable flexibility in the component encoding. The (partial) contents of the ComponentLenTab are:
Component Encoding, shown in FIG. 3.

Symbolic Components

Symbolic components are normally strings of characters. The length of a symbol is 1, as stored in ComponentLenTab, since the only fixed part is the first byte itself. The characters are binary values from 128 to 255; the top-most bit of each character byte is on.

Straight ASCII is not used because it sorts incorrectly. One change is that the uppercase and lowercase letters are interleaved as follows:

aAbBcCdDeEfFgGhHiIjJkKlLmMnNoOpPqQrRsStTuUvVwWxXyYzZ

This interleaving still does not allow for capitalization-independent ordering as used in a dictionary. Also, there are special codes for foreign languages. In Spanish, for example, the letter pairs 11 and ch are special cases which sort as one character, following l and c respectively. The conversion between symbol characters and ASCII can be done quickly using tables.

Binary Components

The binary format is used primarily for integers, but may be used to store adjusted binary floating point or other data types. The binary format is very fast to encode, since there are no restrictions on the byte values used. For storing integers, leading zeroes are removed from positive numbers, and leading ones are removed from negative, two's complement numbers. This compaction keeps the components independent of processor register lengths and eliminates overflows that require restructuring the database by increasing the lengths of all the stored integers. When storing non-integers, the leading zeroes can be left intact for speed. Conversion routines for storing either integers or binary float as binary are discussed below.

Normally, there are no variable-part bytes in an integer, but they may be used for special purposes. The values of the variable part are from 128 to 255, and are considered 7-bit binary.

Decimal Components

The decimal format is intended to encompass any decimal data type likely to be found in any computer system. It can expand its exponent to four bytes, if necessary, and the mantissa has an unlimited variable length.

The exponent is an unsigned binary integer zero, one, two, or four bytes in length. The sign of the exponent is determined by the first component byte. (The exponent will normally be stored as two's complement in a long register during software arithmetic operations.) Exponent bytes are ones complemented if either the exponent is negative or the mantissa is negative, but not if both are negative.

The mantissa is stored as a base 100 fraction, with negatives 99's complemented. Each base 100 digit is biased by 128, so the values range from 128 to 227, even if 99's complemented. Negatives are indicated by a different set of first component bytes. Conversion between packed BCD and biased base 100 can be done quickly using tables.

PURPOSE OF THE ENGINE

The Engine provides computer-based data storage and retrieval capabilities for applications programs using direct access storage devices such as fixed or flexible disks together with random-access memory for data cacheing The single access method provided can be called keyed random or sequential access, with variable length keys, and with the data concatenated onto the key rather than being stored separately. The Engine uses an improved B-tree algorithm and special data structures, which provide performance, storage efficiency, and reliability advantages, which are discussed below in more detail.

Client access to all data is by key—either randomly or sequentially—rather than via pointers, hashing, or simple sequential. Using only one access method is simpler to deal with from a client programmer's standpoint, but would normally be too slow. The Infinity Engine is fast enough to allow this simplification.

The Engine is not a complete database management system per se', since it does not have any knowledge of the semantics (meaning) or the organization (data formats) of the data it stores. Instead, the Engine is used as a component in larger systems, such as the Infinity Database Management System, which define a mapping between the structures stored by the Engine and the concepts being represented. This mapping is particularly easy to establish using the Engine and its associated "Entity-Attribute model" data structuring methods, and the resulting system is more flexible than most "Relational model" systems. (see "Infinity Database Management System Consistency Layer" for a discussion of the flexible Entity-Attribute data model used by the Infinity Database Management System.)

"Prefix compression" is a feature of the Engine which is very important if the Engine is to be used for storing Entity-Attribute structures the way the Infinity Database Management System does, since long common prefixes are the rule rather than the exception under this organization. The lack of prefix compression might increase the total storage requirements of any given set of Items manyfold. The lack of prefix compression would not render the Engine useless, but only storage inefficient; an example of a useful but non-prefix-compressing Engine equivalent is an "Engine Simulator" which duplicates the interface to the Engine and can temporarily store a small number Items for the purpose of testing and demonstrating applications programs until a better Engine is available.

Standard B-trees as Data Access Methods

For a general discussion on B-trees, see Knuth, Donald E., The Art of Programming, vol. 3, on Sorting and Searching, pp. 471–480 (Addison-Wesley, 1973). A B-tree is logically one of many possible means for storing, incrementally modifying, and selectively retrieving a value-ordered sequence of "keys." For our purposes, a B-tree can be defined as follows. A B-tree is a balanced L-level tree with each node or "cell" containing between B/2 and B branches. Each pair of adjacent branches in any cell is associated with a "key" which is in magnitude greater than that to be found in any cell below the left adjacent branch, and in magnitude less than or equal to that to be found in any cell below the right adjacent branch. A B-tree thus strictly orders the keys and defines a unique search path from the root to the leaves for any given key. Insertion of a new key into such a tree can be accomplished usually by merely inserting the key into the proper sequential position of the leaf (bottom level, level 0) cell; if there would then more than B keys in the leaf cell, it must be "split" into two new leaf cells each having B/2 keys, and some key which divides the ranges of the new cells must be inserted into the proper cell at the next level up, recursively. Our definition differs from the traditional in that non-leaf keys do not carry information, but merely serve to direct the search; the occurrence of a given key at a non-leaf level does not imply that it occurs in the logical value-ordered sequence of keys.

Systems which use B-trees for data access on disk typically use one disk data "block" (or "sector") or more for each B-tree cell, and provide a "cache" or copy in primary memory for one or more B-tree cells so that commonly needed cells are available without disk I/O. The set of cells in the cache can vary from time to time; usually each cell newly read from disk goes in the cache, in place of some less important cell. The choice of cell to replace is called the replacement algorithm; a typical algorithm is 'least-recently-used'.

A B-tree 30 as used in the database engine of this invention is shown in FIG. 4. We will hereinafter refer to level 0 cells 32, 34, 36 and 38 in the B-tree 30 as the "Leaf" level. Similarly, level 1 cells 40, 42, 44, and 46 we will call "Branch level"; the highest level cell 48, level 2, (but below the Ground level) we will call the "Root level". The Ground level is unique to infinity and is nominally 64. The binary relation constituted by the branch pointers will be hereinafter be called the "Parent/Child" relation. The "Parent" cell of a given cell is the one at the next higher level which contains the branch pointer to the given cell. The "Parent key" of a given cell is the key in the Parent cell which is associated with the branch pointer to the given cell.

The Infinity Modified B-tree Algorithm

Terminology

Cells may in principle be any size, but are standardized at 256 bytes long, so that offsets into a cell are one byte. The 256 bytes needed to store a cell we will hereinafter call a "page", whether on disk or in the cache. Pointers to cache pages are called PageNums, and their length is PageNumLen, which is dependent on the size of the cache, but typically one byte. Pointers to disk cells are called CellNums, and their length is dependent on the size of the disk, but typically two to four bytes.

The Meta Tree

Figure 5:
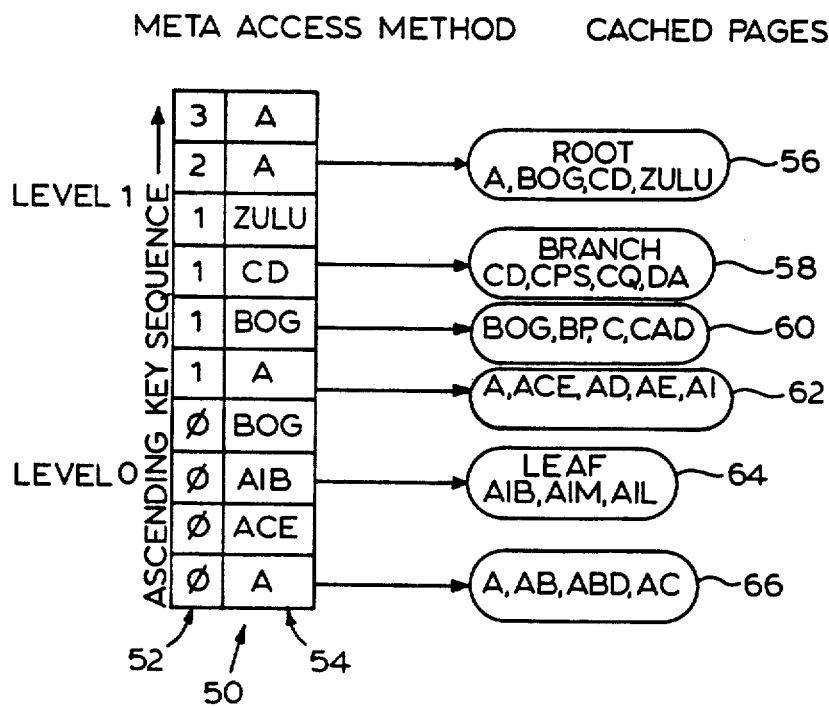
FIG. 5 is a block and flow diagram of an access method used in a database engine in accordance with the invention.

The essential performance—and reliability-improving concept of Infinity is the "MetaTree", an example of which is shown at 50 in FIG. 5. The MetaTree 50 is a B-tree in its own right, but it occupies only RAM memory, rather than some RAM and some disk memory, as does the B-tree 30 proper, which we will hereinafter refer to as simply the BTree (no hyphen) 30. Terms which can be applied to either tree 30 or 50 may be prefixed hereinafter by a "B" when they refer to the BTree 30, or by "Meta" when they refer to the MetaTree 50.

The MetaTree 50 indexes all of the BTree cells 32–48 which are in the RAM cache, including BTree cells of all levels, not just those at the leaf level. The MetaTree Item for any BTree cell 32–48 is the concatenation of the level number 52 (one byte) with the first Item 54 in the BTree cell. Thus any level of the BTree 30 is directly indexable via the MetaTree 50, and the levels appear in ascending order during a Item-sequential scan of the MetaTree 50. An important feature of the MetaTree is that data in all cached BTree cells 32–48 can be accessed through the MetaTree 50 without reference to the parent BTree cells 32–48. When used in this way, the MetaTree can be thought of as one level deeper; the MetaTree together with its "sub leaf" level of cached BTree cells 56, 58, 60, 62, 64, 66 is called the BMetaTree.

The MetaTree 50 is very quick to search, since:
(1) The MetaTree has fewer levels than the BTree, since it indexes only the contents of the cache, which is smaller than the disk (and we assume the disk is approximately full of indexed data);
(2) The MetaTree contains, as the branching pointers, cache page numbers instead of disk page numbers, which would have to be translated to cache page numbers by means of some other data structure.
(3) The format of data in the cells is particularly suited to searching using the macro or micro instructions available in typical computers. The format is simple enough to allow dedicated hardware designs using custom microprogramable controllers, SSI, or even VLSI.

The simplicity of the data format is possible because the Engine does not "know" anything about the semantics of the data. It does not know a special method for comparing the magnitudes of, say, dates. Instead, dates or other keys must be converted into format accepted by Infinity, which is called an "Item". An Item is a contiguous string of binary bytes from 0 to a maximum length called MaxItemLen. MaxItemLen is typically 99 bytes. The comparison of two Items is performed simply by comparing the binary values of their byte strings, with most significant byte at the beginning of the string. If an Item is a prefix of another, it is the lesser. In this way, Items behave as binary fractions, with an implied "binary point" preceding the first byte.

When an Item is stored in memory outside of the Engine, it is contained in a "Cursor". A Cursor is MaxItemLen+1 contiguous bytes of memory, with the first byte dedicated to storing the length of the contained Item, and the subsequent MaxItemLen bytes dedicated to storing the value of the Item.

Cursor Storage Format

| Len | MaxItemLen bytes of text | |
|---|---|---|

When a cursor is being used with the MetaTree, however, the prefixed BTree level number byte is placed in the length byte of the cursor, and the actual length is stored separately.

The MetaTree occupies cache pages as needed for its purposes, leaving the rest to be used for BTree pages. The basic structure of cells in the MetaTree and the BTree are identical, so that much of the program code used to manipulate and search the two trees can be shared.

The MetaTree also makes it possible to provide concurrency, insofar as client programs whose accesses require disk I/O can be put on an internal wait queue so that other requests can be serviced. Some methods for concurrency in BTrees are known in the art but none provides the degree of concurrency provided by the MetaTree approach. This will be discussed under Concurrency below.

Cell Data Format

Figure 6:
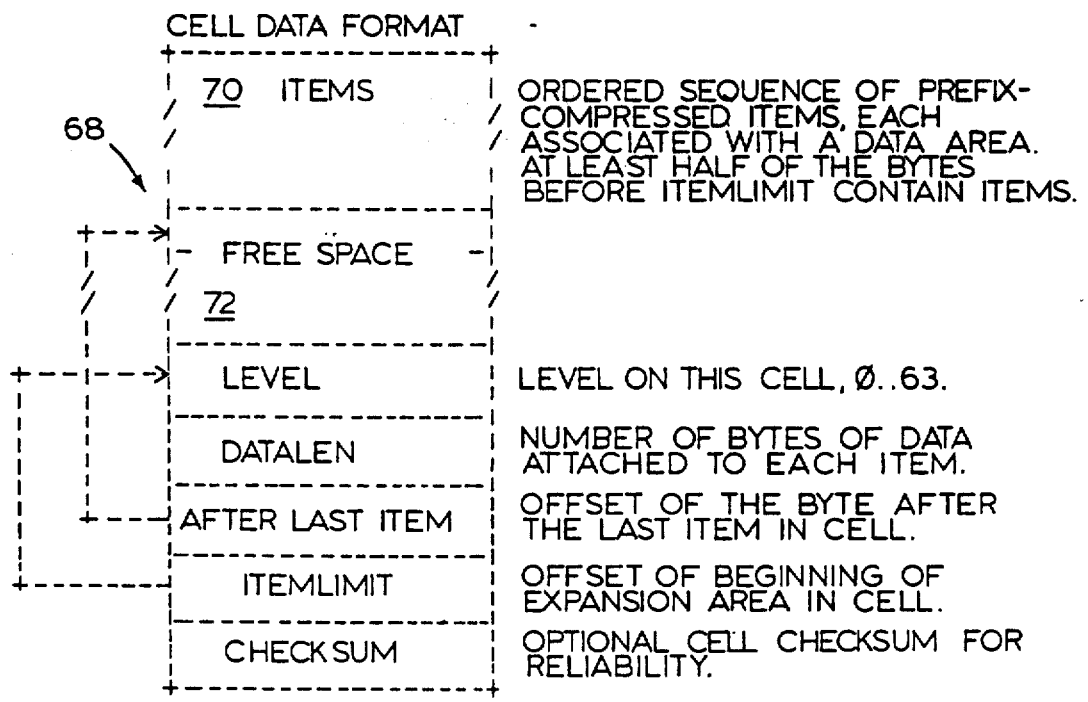
FIG. 6 is a block diagram of a cell data format used in a database engine in accordance with the invention.

The cell data format 68 is shown in FIG. 6. Items in a cell are stored packed at the front 70, with free space 72 following, and an area of cell-specific values called the expansion area at the end. The initial area containing Items will normally occupy at least half of the space below ItemLimit. This does not apply to the GroundCell or to the RootCell. This half-full rule supercedes, for any B-tree using variable-length keys, the ½ b rule, where b is the constant maximum number of fixed-length keys a cell can contain.

Additional information can be stored in any cell's ExpansionArea by reducing the value of ItemLimit. The absolute minimum for ItemLimit is MinItemLimit, which is sufficient to allow at least two Items in any cell. The GroundCell's ExpansionArea includes the BRootLevel, along with information describing the characteristics of the disk and any information which must be committed at the same moment as the rest of the BTree.

Figure 7:
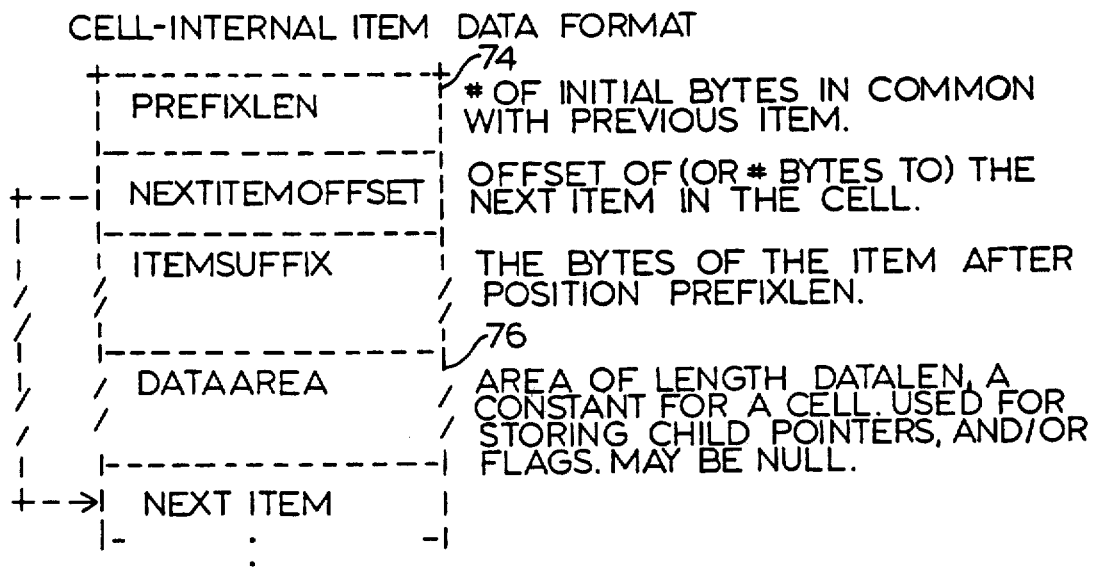
FIG. 7 is a block diagram of another cell data format used in a database engine in accordance with the invention.

The Items in a Cell are stored as shown in FIG. 7. Each stored Item except the first in a cell is "prefix compressed". This means that the initial bytes that it has in common with its immediate predecessor are not stored. The number of bytes so omitted is indicated by the PrefixLen value at the beginning 74 of every Item.

Figure 8:
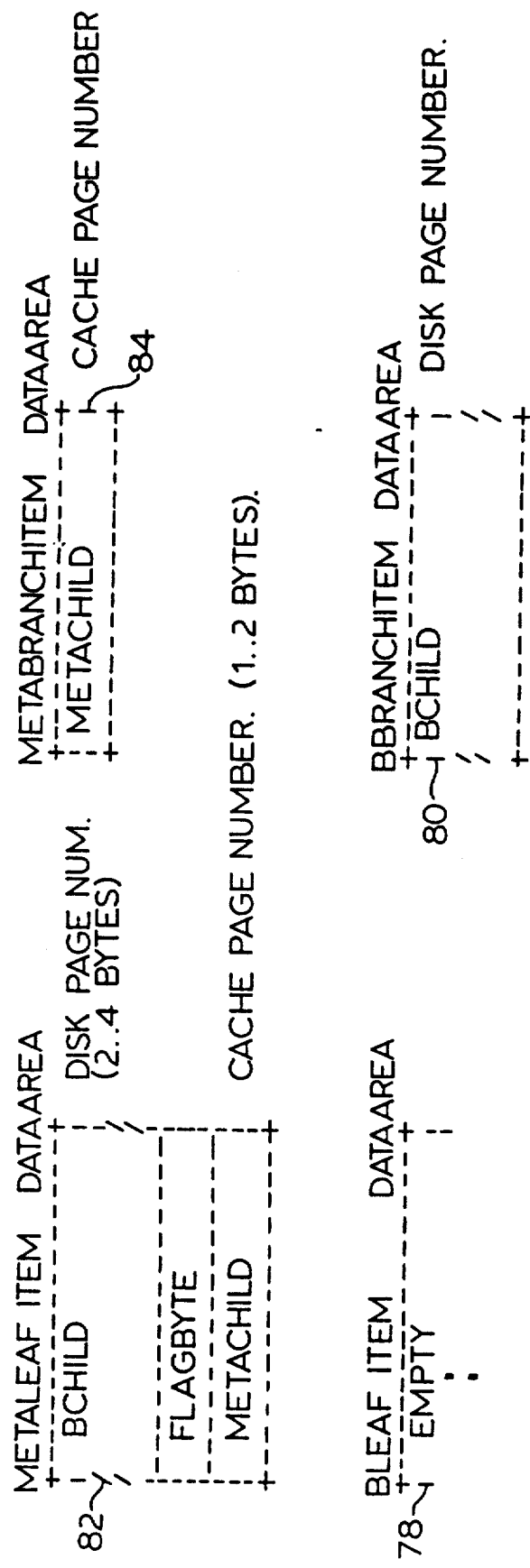
FIG. 8 is a block diagram useful for a further understanding of the access method shown in FIG. 5.

The beginning of the DataArea 76 of an Item is located by skipping over the Item and indexing backwards by DataLen, which is a cell-constant value. The use of the DataArea 76 depends on the type of the cell, as shown in FIG. 8. BTree leaf cells 78 have DataLen=0, so there is no DataArea. BTree index cells 80 have only a disk page number in the DataAreas. MetaTree leaf cells 82 contain space in the DataArea for: a disk page number, which points at the BTree cell on disk; a flag byte; and a cache page number, which points at the BTree cell in the cache. MetaTree index cell 84 DataAreas contain only a cache page number, which is the MetaChild pointer. The cache page number pointers in MetaTree cells 84 always occur last, so they may always be found by indexing backwards by PageNumLen from the end of the DataArea.

Working with Prefix Compressed Items

Searching a Cell for an Item in a cursor is very efficient, given the following algorithm:

Search a Cell for an Item in a Cursor:
(1) Set a pointer to the first Item, which is never compressed; Set a pointer to the cursor, which moves forward during matching; and place a zero after the last Item in the next PrefixLen position to serve as a sentinel.
(2) Compare the initial Item and the cursor, setting MatchLen =number of matching bytes, but not more than cursor length or InitialItem length, and moving the cursor pointer over the matched bytes. (Remember, the initial byte of an internal cursor is not the cursor length, but is considered part of the value.) If the two are identical, stop. If the InitialItem is larger than the cursor, we are searching in the wrong cell.
(3) Move to the next Item in the Cell.
(4) SkipLongerPrefixes. This means skip over every item whose PrefixLen >MatchLen. If after last Item, stop.
(5) Compare the ItemSuffix and the part of the cursor under the cursor pointer, moving cursor pointer forwards one byte and incrementing MatchLen for every matching byte, but not farther than the end of the Cursor or the end of the ItemSuffix. If an exact match, stop. If the end of the ItemSuffix is found before a value difference, goto (3). If the end of the cursor is found before a value difference, stop. If the differing byte is greater in the Item, stop. Otherwise, goto (3).

An additional speed improvement is gained by recognizing that every ItemSuffix is at least one byte long except for the null Item, which is handled as a special case. An intermediate loop can be placed surrounding SkipLongerPrefixes but within the main Search loop:
(4a) If the byte under the cursor pointer is greater than the first byte of the ItemSuffix, which must exist, then goto (3).

During this loop, the byte under the cursor pointer can be kept in a register.

The search algorithm is fast because most of the searching is done by SkipLongerPrefixes, which is extremely simple:

SkipLongerPrefixes:
1) If the PrefixLen of the Item pointed at is less than or equal to MatchLen, stop.
(2) Increment the Item pointer.
(3) Add the offset pointed at by the ItemPointer to the ItemPointer.
(4) goto (1).

Reconstructing a complete Item in a cursor given a pointer to a compressed Item in a cell requires scanning the cell from the beginning. A simple algorithm simply copies each ItemSuffix over the cursor; after the desired Item's ItemSuffix has been copied, the Item has been reconstructed. A faster algorithm, which can incrementally reconstruct an Item in a cursor when the cursor is known to already contain the complete value of a preceding Item in the cell, ScanFromItem, is as follows:

ConstructPrefix: (assume 256 byte cells, hence one byte offsets)
(1) First Pass. Scan the Items in the Cell from ScanFromItem to DesiredItem to find MinItem, which is the one with the smallest PrefixLen, MinPrefixLen. After the scan, zero the cursor from MinPrefixLen to DesiredItemPrefixLen.
(2) Second Pass. Scan the Items in the Cell from MinItem to DesiredItem, and while skipping Items whose PrefixLen >DesiredItemPrefixLen, write each scanned Item's offset within the cell into the cursor at position PrefixLen.
(3) Third Pass. Set a pointer SourcePtr to MinItemSuffix. Scan the bytes in the cursor from MinPrefixLen to DesiredItemPrefixLen. With each scanned byte ScanByte, if ScanByte is nonzero, then it is an index of an Item in the cell, so set SourcePtr to point at the ItemSuffix of the indexed Item. Before scanning the next cursor byte, copy one byte from under SourcePtr to the scan position in the cursor, thus changing ScanByte to the correct Item value.

In case the cursor is known to contain the complete value of an Item less than DesiredItem but not less than the predecessor of DesiredItem, ConstructPrefix is not needed because DesiredItemSuffix may simply be copied over the cursor at position PrefixLen. This is the case after a Search, as described above.

The Flag Byte

The FlagByte, which occurs in the DataArea of each MetaLeafItem preceding the MetaChild page number, contains the following bits:

| | | | |
|---|---|---|---|
| PairBit | EQU | 10000000B | ;Item is left part of Pair. |
| InRAMBit | EQU | 01000000B | ;In RAM. PageNum valid. |
| DirtyBit | EQU | 00100000B | ;Cell is modified and InRAM. |
| IOBit | EQU | 00010000B | ;I/O is in progress to/from |

-continued

| | | | disk. |
|---|---|---|---|
| AllocBit | EQU | 00001000B | ;CellNum is valid. |
| MoveBit | EQU | 00000100B | ;Move Cell. (Range change etc) |
| RawCellBit | EQU | 00000010B | ;Cell has RawData, not Items. |

The PairBit indicates that the MetaItem and its successor define an ItemPair for some cell. An ItemPair serves as a kind of cache of the information represented on disk in the cell's BTree ParentItem (the "BParentItem)and its successor. The ItemPair defines a range of Items over which the cell applies, in the same way as the BParentItem and its successor, except that the ItemPair can exist in memory without the BParentCell. The CellNumber from the BParentItem is stored in the DataArea of the ItemPair as well.

The InRAMBit is on if the ItemPair's cell is in the cache. The of the cache page number is valid only if the InRAMBit is on.

The DirtyBit is on if an InRAM cell has been modified in any way, in which case it needs to be written to disk. The DirtyBit can only be on for an InRAM cell.

If the IOBit is on, then if DirtyBit is on then the cell is writing or soon to be written, or else the DirtyBit is off, and cell is reading or soon to be read. In some situations a false "cell reading" state is created artificially by setting IOBit=1 and DirtyBit=0. This prevents a cell which is being worked on in some special way from being modified or examined by other client processes. When the cell is complete, IOBit is reset and DirtyBit is set. In other cases, false "cell writing" state is created artificially by setting IOBit=1 and DirtyBit=1 to prevent a cell from being modified but to allow it to be examined. Normally, the IOBit is turned off by disk I/O completion, but if no I/O has been initiated, the IOBit will stay on indefinitely.

The AllocBit indicates that the cell currently owns an allocated page on disk, whether or not the cell has been stored in that page on disk.

The MoveBit indicates that the cell needs to be moved to a new location on disk before being written, even if it is already allocated a disk page. The MoveBit is set whenever the cell's Item range changes as a result of being merged with adjacent cells or being split into two cells. It is also set for any BBranch cell which changes for any reason.

The RawCellBit is an optional feature which allows leaf pages to be used for other purposes than storing Items. It will not be further discussed.

The Legal states for the PairBit, InRAMBit, DirtyBit, and IOBits are shown below:

```
PairBit
 InRAMBit
  DirtyBit
   IOBit 0 0 0  0
0 0 1  Illegal
0 1 0  Illegal
0 1 1  Illegal
1 0 0  0
1 0 1  Illegal
1 1 0  0 => Preemptable 1 => Reading
1 1 1  0 => AwaitingIndexUpdate; 1 => Writing
       or about to.
```

Searching and Updating the BTree

The six essential client program interface functions are:

| First(cursor) | move cursor forwards to nearest stored Item >= cursor. |
|---|---|
| Next(cursor) | move cursor forwards to nearest stored Item > cursor. |
| Last(cursor) | move cursor forwards to nearest stored Item <= cursor. |
| Previous(cursor) | move cursor forwards to nearest stored Item < cursor. |
| Insert(cursor) | store the cursor's Item. |
| Delete(cursor) | remove the cursor's Item from storage. |

These functions all use an internal function called BFind, which returns a pointer to the nearest Item greater than or equal to the cursor, reading cells from disk into the cache if necessary. BFind starts at the leaf level, and uses the BMetaTree to search for the BLeaf cell containing the given cursor. If the BLeaf cell is cached, it will be found directly. If not, then the next BTree level upwards is searched via the BMetaTree. This process repeats, moving upwards until some level is found where a cached cell contains the cursor. The process always terminates at the root, since the root is always kept present in the cache. Then the process moves downwards, one level at a time, making a child ItemPair from the nearest-greater-than-or-equal BItem (the NGEBItem) and its predecessor, reading the child cell from disk, and searching the child cell to find the child NGEBItem.

The Index Update Process

A background process called "Index Update" or "IU" cycles through the cache, initiating the asynchronous writing of modified or "dirty" cells to disk, and indexing each such written cell at the next higher level. The process begins with the cached leaf cell with the lowest Item and proceeds through leaf cells with ascending Items, then through levels by ascending level until the root is reached. This ordering is available directly from the MetaTree, as described above. After the root is processed, Index Update waits for all pending writes to complete, and then writes out a special cell called the "ground cell" which is always at a known location on the disk and which points to the newly written and possibly moved root cell. The ground cell has a constant nominal level of 64, whereas the level of the root cell varies depending on the amount of data being stored.

Structural Integrity Preservation

The writing of the ground cell commits the Index Update cycle; before the writing of the ground cell a catastrophe such as power failure will leave an intact BTree structure. The purpose of the commit cycle is not, however, to provide a guarantee of consistency at a higher level, i.e., semantic consistency according to the client programs. Rather, the commit cycle is a reliability feature insofar as catastrophes will not leave unpredictably confused structures on disk that will later cause either the retrieval of erroneous data or system failure.

In order to guarantee semantic consistency, the client program must maintain a transaction log of its own. Such a log would record, among other things, Index Update commits and client transaction updates (Inserts and Deletes) in the order of occurrence. In the event of a catastrophe, the log is read starting two Index Updates back, and the updates are repeated. This works because any update is guaranteed to take permanent effect no later than the second subsequent Index Update cycle. An update may take permanent effect immediately, however.

The Index Update process is the only source of calls on the disk space allocator and on the cell write function. Index Update never overwrites an existing Branch cell or any BLeaf cell whose Item range has changed. Each modified Branch cell goes in a new location on disk, and since each motion of a cell requires a modification of its parent cell, the effect is that each modification of any leaf cell requires moving the entire path of cells from the leaf to the root. The performance penalty of this additional modification is insignificant for several reasons: (1) the writes occur in a "background" process at low priority; (2) the higher-level cells on the path to the root are shared with many other writing paths due to update locality; (3) the lower—level cells on the path to the root which are not shared are usually stored nearby to the leaf cell and incur no additional seeks; (4) the writes tend to be in ascending order on the disk, so head motion optimization is effective; (5) many BLeaf cell updates can be performed in place before a split or merge changes the cell's Item range, which then incurs the more expensive index updating.

Concurrency

During the Index Update process, the BTree structure is changing while client calls are calling BFind, which relies on the BTree structure. This would lead to confusion were it not for the fact that BFind begins at the bottom of the BTree and searches upwards, instead of downwards as is conventional. The upwards search is only possible due to the ability of the MetaTree or some similar in-memory structure to locate a BCell at a given BLevel by Item without using any of the BTree structure.

In order to keep BFind working only with up-to-date BCells, i.e. those BCells that have been processed by the current Index Update cycle, Index Update always completes the modification of the BParent of a given cell before allowing the given cell to be written and then removed from the cache. Only when the given cell is removed from the cache will its BParent become "visible" to BFind over the Item range of the given cell. The Index Update cycle finds each Dirty BCell, sets its BParent cell's DirtyBit to lock it into the cache, then modifies the BParent so that it correctly indexes the BChild cell, and finally, initiates writing of the BChild cell, which will eventually reset the BChild's DirtyBit. Once the DirtyBit is off, the cell becomes pre-emptable and may be removed from the cache if space is needed.

In order to avoid the special problem of a client-process-caused Insertion splitting a BLeaf cell after it is indexed in its BParent but before it is actually written, IU sets the IOBit of the BLeafCell. A writing cell cannot be modified in any way until the I/O completes, or the results will be unpredictable. Whenever a cell is to be modified by any client process, the process first waits for the IOBit to go off if it is on, and then sets the DirtyBit. When IU actually starts the write, StartWriteCell leaves the IOBit on, then reset its on completion.

Disk Space Allocation

The management of disk space is performed by a dual bit map. Each bit map, called a CellMap, is an array of bits, with one bit corresponding to each disk page that may potentially be used for storing a BTree cell. The two maps, called "OldCellMap" and "NewCellMap" are necessary in order to prevent the immediate re-use of a deallocated cell within the same Index Update cycle. When a cell is allocated, the OldCellMap is searched for a zero bit, and then the corresponding bit is turned on in both maps. For deallocation, the proper bit in NewCellMap is turned off, and OldCellMap is left unchanged. On commit, NewCellMap is copied over OldCellMap.

The extra bit map is also helpful in performing reconstruction of the cell maps on initialization as follows. Multiple passes over the disk each read in all cells of a certain level. Both maps start out zeroed, the ground cell is read, and its bits are set to 10 (this means OldCellMap[groundcell]=10, NewCellMap[groundcell]=0). On each pass, the cells read in a previous pass have state 10; those to be read in the current pass have state 11; and those to be read in the next pass have state 01. As each 11 cell is read, its bits are set to 10, and the cells it points to are set 01. After each pass, we logically OR the NewCellMap onto the OldCellMap.

The above bitmap construction algorithm allows the level number stored in each cell to be compared with a level counter that decrements with each pass, starting at the root level. A faster disk scan can be had by allowing the reading of the levels to mix; one simply sets each pointed-at cell's bits directly to 11 instead of 01. No ORing of the maps is necessary. This speedup is similar to the Warnok algorithm for computing the transitive closure of a binary relation; the binary relation in this case is the parent/child relation of cells in the BTree.

Other Necessary Structures

The parent-pointer table or "ParentTab" is an array of cache page numbers, each entry corresponding to a cache page. For each BTree cell in the cache, the corresponding entry in the ParentTab points at the MetaTree leaf-level Item which indexes it: the BTree cell's "ParentItem". For each MetaTree cell in the cache, the corresponding entry in the ParentTab points at the MetaTree index-level Item which indexes it: the MetaTree cell's ParentItem. The ParentTab constitutes an inversion of all of the cache-page pointers in MetaTree cells. No similar inversion exists for the disk-page pointers in the BTree.

The ParentTab allows, among other things, for a very fast structural update of the MetaTree, since the Insert algorithm need not keep the MetaTree search path on a recursion stack. Instead, the search is iterative, ending at the MetaLeaf level, and splits or merges propagate upwards iteratively via the ParentTab as far as needed.

The segment table or "SegTab" is actually two tables, the ForwardSegTab and the BackwardSegTab. Each table associates with each page in the cache a forwards and a backwards link to two other pages in the cache. These links are used to form bidirectionally linked rings of pages called Segments. There is a single Segment called FreeSeg, which contains all of the free pages in the cache. The PreemptSeg contains all of the BTree cells which are possible to erase from the cache in order to make space for new cells to be read from disk. The PreemptSeg also maintains the priority order of the pre-emptable cells so that only the least recently used cells are pre-empted.

Pre-emption of Cached Cells

Whenever space is needed in the cache, a page from the bottom of the PreemptSeg is removed. The PreemptSeg also contains some Dirty cells since Dirty cells are not removed from the PreemptSeg at the moment they become Dirty. Any such Dirty pages at the bottom of the PreemptSeg are are simply removed as encountered during preemption, and are left floating, in no segment at all. When DirtyPages are written, they move to the IOSeg, which is used by the head-motion-optimizing I/O module to order the multiple requests by cylinder. When the IO is complete, the page is restored to the PreemptSeg, at the most-recently used position. An I/O is thus considered a "Use" of a page. Other uses of a Page, such as Inserting or Deleting an Item in it, can be signalled as appropriate via the UsePage function, which moves the page to the most-recently-used position of the PreemptSeg.

The removal a a preemptable page from the cache causes an ItemPair to become obsolete. One or both of the Items in the pair may be possible to delete in order to reclaim space, depending on whether each is participating in an adjacent ItemPair. Rather than removing obsolete or "ZombieItems" on creation during preemption, they can be deleted by the Index Update cycle later. The PageNum part of the DataArea of the ItemPair is set to zero and the entire FlagByte is zeroed as well. Index Update looks for two Items having zero PairBits in a row, and deletes the second Item, returning to the first Item to continue the scan (It is the left Item in a pair which contains the relevant FlagByte.)

During the deletion of the "ZombieItem", the MetaTree may change structurally. This means that the Item before the ZombieItem may move during the deletion. In order to keep track of it, the ScanItem's PageNum is set to point at a special page called the "ZombiePage", which is usually page 1. The changes to the MetaTree also maintain the ParentTab, so it can be used to find the ParentItem of the ZombiePage, which is the Item before the deleted ZombieItem again.

Locking

Processes must not be allowed to switch in the middle of such operations as MetaTree searches and updates. A single, global lock is used to synchronize all processes, including the Index Update process, for this purpose. The entrance to each client interface call requests and waits for the lock, and the exit releases it. The ReadCell function: releases the lock, allowing another client process to enter via a client interface call; initiates the read; suspends the process until the read completes; and requests the lock again. The writing of cells is asynchronous, and the StartWriteCell function does not affect the lock. The Index Update process releases the lock during the wait for outstanding writes to complete.

Avoiding Preemptable-Page Resource Deadlock

The IU cycle "consumes" a preemptable cache page each time it sets the DirtyBit of a cached ParentCell prior to modifying it. The IU cycle creates a preemptable cache page each time it initiates the writing of a ChildCell it has finished processing. Since there are never two Parents for a given cell, the IU process conserves preemptable pages in the worst-case. In most situations, it is a net producer of preemptable pages.

If a considerable amount of contiguous deleting has occurred between IU cycles, IU will have to merge together a group of empty or nearly empty BLeaf cells, and the indexing of the resultant merged cell will in turn cause deletions at the Parent level. The deletions may span a ParentCell, so it is possible that the indexing operation will produce two dirty ParentCells for a single merged Leaf cell. There is still a net conservation of preemptable cells in the worst case, however, since at least one Leaf cell was merged and its page freed. Free pages count as preemptable pages.

If there was Insertion between IU cycles, a BLeaf may have split, and the indexing of the right cell of the split will require an insertion at the BParent level, which may in turn cause a split. Thus two BLeaf cells are consumed, and up to two BParent cells are produced.

In spite of the fact that the IU process is a net conserver of preemptable pages, it is necessary to continuously maintain a preemptable page counter and compare it to a threshold value, below which client Insert and Delete operations are temporarily prevented. Without the counter, the cache may suddenly fill with dirty pages, leaving no work space at all for IU. When the threshold is crossed, the IU process is awakened, and a new cycle is started, if one was not already in progress.

Cell Packing

The IU process merges or balances every cell, "LowCell," it finds in the cache which is less than half full with the cell to its right, "NextCell," so long as both cells have the same BParent. Before merging or balancing, the NextCellmay need to be read into the cache.

EvenBalancing moves data from NextCell into LowCell so that both are more than half full. LeftBalancing moves as much data as possible into LowCell, leaving NextCell with the remainder. Left-balancing can be applied selectively instead of Even-balancing in order to achieve storage efficiencies better than 50% minimum / 75% average, which is the result otherwise. However, each LeftBalancing may leave NextCell less than half full, thus requiring another merge or balancing. There is thus a tradeoff between increased storage efficiency due to LeftBalancing and increased delay due to additional cell reads. Average storage efficiency may be improved while leaving minimum unchanged by preventing extra reads merely for the purpose of LeftBalancing.

The Example System

The assembly language source code for an example system is in Appendices 1-8 in U.S. Pat. No. 5,010,476 to this application. Some features in this system are not explained above because they are non-critical and only partially implemented in the example system. They are discussed below.

"Shadowing" is an optional feature for preventing client process delays on cell writes. When a cell is to be modified by a client process update, the system may simply delay until the IOBit is 0, then set the DirtyBit and proceed with the modification. Instead, shadowing: (1) makes a copy of the cell being written, which can be done because the writing cell is legal to examine, if not to modify; (2) removes the writing cell from the BMetaTree; (3) installs the copy cell into the BMetaTree in place of the writing cell; and (4) creates a temporary "ShadowItem" in the MetaTree to serve as the MetaParentItem of the writing cell only until it completes writing. The ShadowItem is made unique by adding 64 to its most significant byte, which places it above the BRootMetaParentItem, which is at nominal BLevel 64. ShadowItems are deleted by IU.

Volume name prefixing is an optional feature which inserts a fixed-length string of bytes called the "VolName" after the BLevel byte and before the rest of the bytes of each MetaItem in the MetaTree. The length of a VolName is VolNamePrefixLen, which is a boot-time constant. The purpose of the VolName is to make it possible to simultaneously manage multiple BTrees, such as when multiple disk drives are used. VolNames are not part of any BCell or BItem, so a given BTree is not dependent on its VolName. Thus the VolName of a particular BTree may be bound at the time the BTree is opened for use. The addition VolNamePrefix does not add complications by creating a distinction between BItems and MetaItems, since BItems are already one byte shorter than MetaItems (the BLevel byte)

TightPacking is an optional flag which turns on Left-Balancing during cell packing in IU.

Additional space is provided in the ExpansionArea of the BGroundCell for information describing the characteristics of the disk, including: TracksPerCylinder; SectorsPerTrack; BytesPerSector; the Helix rate (offset of sector zero for between tracks); CylOne, the first available cylinder; MaxCellNum, the largest legal cell number; and CellNumLen.

An optional feature called PagedCellMaps allows for BTrees so large that their CellMaps do not fit in memory. PagedCellMaps are read dynamically into the cache as needed, and a CellMapValidity flag in the GroundCell's ExpansionArea is committed at the same time as the rest of the BTree. The copy of the validity flag on disk is turned off before updates to the maps begin, so that a catastrophe before commit will leave the CellMaps flagged as invalid and they will be re-created when the BTree is next opened. The pages of a PagedCellMap require their own MetaParentItems; the logical space for these MetaItems is already reserved—any MetaItem with initial byte > = 128 can be used.

Modules

Each module in the system occupies its own separate file The modules are written in 8080 assembly language and routinely transliterated into 8086 assembly language, but the principles of the system are applicable to system programming languages such as C.

| Module name(s) | Purpose |
| --- | --- |
| SYS-PC,IO | Contains all operating system and device dependencies. |
| TESTER | Above the Engine level: provides Item Editor, testing. |
| PAGE | Manages cache pages. Manages sets of pages called 'segments' which are bidirectional rings of pages. There are segments for: MetaTree pages, free pages, pre-emptable pages, dirty pages, and bad pages. Cell order within the preemptable segment is used by the least-recently-used page replacement algorithm. |
| KERNEL | Multi-tasking switcher, semaphores. |

| Module name(s) | Purpose |
| --- | --- |
| CELL | Functions that work with single MetaTree or BTree cells, without knowledge of their being connected into trees. |
| MTREE | MetaTree searching, inserting, deleting, and so on. |
| ALLOC | Manages disk pages for use in storing BTree cells: allocate, deallocate, re-create allocation maps |
| BTREE | Btree searching, inserting, deleting, and so on. |
| IU | Index Update: the process which cycles through the cache, writing dirty pages to disk and indexing them at successively higher levels until the root is reached, at which time the disk structure is committed. |
| VALIDITY | Functions which can test data structures for characteristics which they are expected to exhibit during the operation of the system. A non-essential reliability feature and debugging aid. |
| UTILS | General purpose functions: move, scan, multiply, bitmap search. |
| DATA | Global variables and tables. |

The Infinity Database Engine is a high-speed, high-reliability software component available to systems builders. It provides keyed data storage and retrieval on disk or disk file. Accesses and updates are performed by a proprietary algorithm which: preserves integrity through catastrophes such as power failure; efficiently uses a large RAM cache; and allows a high degree of concurrency.

This product is written in optimized 8086 assembly language for maximum performance. Infinity makes a minimum of assumptions about the operating system and hardware configuration, so its basic design is portable. It is even suitable for "casting in hardware" and was written with an eventual back-end processor in mind. The product is written in 8086 assembly language. It provides keyed data storage and retrieval on disk or disk file. Its accesses and updates are performed by a proprietary algorithm which ensures a degree of integrity through power failure. The product requires 64K of resident memory space in an 8086 PC. This space is utilized for code space, bit map, and cache.

PERFORMANCE FEATURES

Very high speed: 500 non-faulting searches per second., 250 non-faulting updates per second on IBM PC; nominal single-seek for cache faults with large cache;

Full concurrency: no significant limit to the number of concurrent readers and updaters; no artificial delays due to internal locking;

Large caches: up to 32K (64K and 1MB versions are planned) with no cache-size dependent degradation in speed of non-faulting operations (most caching systems are a tradeoff);

Hysteresis-like effects: no split/merge thrashing (A run of deletions will not waste time merging or balancing soon-to-be emptied Cells for example);

Smoothed, localized disk allocation: the allocation strategy knows about cylinders and seeking;

Head motion optimization and asynchronous I/O: can be integrated with supplied device drivers for systems with DMA and interrupt-on-completion or other asynchronous I/O interface;

Low inter-process interference: The cache faults of one process do not slow down a non-faulting process (with asynchronous I/O);

STORAGE FEATURES

No limit to database size except for media limitations: The length of block numbers is bound at boot-time and can be up to 20 bytes Variable length keys: each key can be 0 to 100 bytes long, and is stored without wasted space. (Longer keys can easily be split up by the client software into components less than 100 bytes long);

Prefix and suffix compression: Duplicate key prefixes are stored only once per cell to save space and speed searches. Suffix compression shortens index cell keys.

Tunable compaction: The usual 50% minimum and 75% average storage efficiencies can be incrementally improved at the expense of speed.

RELIABILITY FEATURES

Integrity preservation protocol: a power failure or other catastrophe will leave a valid structure on disk; only uncommitted data in RAM is lost.

Complete structure validation: mount-time validation of entire on-disk structure, instant on-demand validation of all in-RAM structures including all cached data.

Extensive internal consistency checking.

PROGRAM INTERFACE

Infinity passes Keys in and out in a "Cursor", which is a 100 byte string preceded by one byte containing the current length. The complete value contained in a Cursor is called an "Item"; the database stores nothing more than a sequence of Items ordered as binary fractions, MSB at front. No other interpretation of the contents of an Item is made. Instead, the client software determines how the components of the Item are delimited and encoded to achieve a desired ordering. Using a uniform internal data format, removes the data conversion and magnitude comparison functions from the data storage function—normally the worst DBMS bottleneck.

Basic function calls provided include:

| | |
|---|---|
| Insert | Add given Item to database |
| Delete | Remove given Item from database; |
| First | Find nearest Item >= given Item; |
| Next | Find nearest Item > given Item; |
| Last | Find nearest Item <= given Item; |
| Previous | Find nearest Item < given Item; |
| Create | Make a new, empty database |
| Open | Begin using a given file or disk as a database |
| Close | Finish using the current database; |
| Update | Write all in-cache modifications to disk; |

THE ENTITY-ATTRIBUTE MODEL

The lack of a separate "data field" in Infinity is no oversight. The intention is that an Item should contain both key and data concatenated. A recommended method is concatenating key and data with a special value—the "AttributeName"—separating them. The AttributeName is a data type determined by the client hence it can be quite long or extensible, and there is no essential limit on the number of AttributeNames that can be used. An AttributeName identifies the data following it—like a field in a record. The AttributeName and the data following it within an Item constitute a complete "Attribute". The data before the Attribute in the Item is an "EntityName" that the Attribute is "attached to."

This "Entity-Attribute" organization can completely replace the conventional fixed-length record, and to great advantage. Attributes can be attached or detached independently, without the need to read or lock an entire record; new Attribute-Names may be created without limit and without a batch reorganization; "null valued" or absent Attributes require no storage at all; and, perhaps most importantly, the number of values per Attribute per Entity is unlimited. This last fact extends the Entity-Attribute data model beyond the direct representational capability of the Relational model and eliminates the need for the complex procedure called Relational "Normalization."

Infinity Database Engine supports only one database at a time in the embodiment described. This limitation, like the lack of a data field, is intentional. The client software again takes the responsibility of defining an additional component of each Item called a ClassName, which in this case is prefixed rather than infixed and which identifies a logically distinct database, corresponding to a file in the-fixed-length record system.

There is no inherent limit on the maximum number of ClassNames. ClassNames are not always necessary, but tend to help in visualizing the Entity-Attribute model as an extension of the Relational model.

VERSION 1.0 UNDER MSDOS

Version 1.0 of the Infinity Database Engine consists of 30KB of object code running under MSDOS and PCDOS with up to 64KB total space useable (the ".COM" model is used). Version 1.0 can only access a single database (one database occupying one file or one disk) at a time. Multiple databases per instance support could be provided.

It should now be readily apparent to those skilled in the art that a novel database user interface, database management system and database engine capable of achieving the stated objects of the invention has been provided It should further be apparent to those skilled in the art that various changes in form and detail of the invention as shown and described may be made. It is intended that such changes be included within the spirit and scope of the claims appended hereto.

What is claimed is:

1. A data storage and retrieval system comprising:
   first generating means for generating a key sequence for constructing a basic index tree structure; second generating means for generating said basic tree index structure responsive to said key sequence; secondary direct access storage means, coupled to said first and second generating means, for storing a plurality of nodes of said basic tree index structure and corresponding key-indexed data;
   primary direct-access memory means for storing a selected subset of said plurality of nodes of said basic tree index structure and said corresponding key indexed data;
   means, coupled between said secondary storage means and said primary memory means, for copying said selected subset from said secondary storage means to said primary memory means;

means, coupled to said primary memory means, for modifying said selected subset;

first accessing means, coupled to said secondary storage means, responsive to a first external inputted key access sequence for sequential accessing said basic tree index structure and said corresponding key indexed data and to an external inputted key value for randomly accessing said basic tree index structure and corresponding key indexed data;

second accessing means, coupled to said primary memory means, responsive to a second external inputted key access sequence for sequentially accessing said selected subset and external inputted key value for randomly accessing said selected subset;

third accessing means, coupled to said primary memory means, for accessing said copied or modified selected subset;

said third accessing means includes determining means for determining a key value range of one of said plurality of nodes of said selected subset and means responsive to an external inputted key value within said key value range to access said selected subset and corresponding key indexed data.

2. The data storage and retrieval of claim 1, wherein the second accessing means and the third accessing means are configured according to a meta access method;

said primary direct access memory means configured to store and retrieve data in a fixed length; and, said secondary direct access storage means configured to store said plurality of nodes in said in said fixed length units, wherein branches of said basic tree index structure are the addresses of said fixed length units.

3. The data storage and retrieval system of claim 2, in which said meta access method is a tree.

4. The data storage and retrieval system of claim 3, in which said tree is a B-tree.

5. The data storage and retrieval system of claim 4, in which said basic tree indexed structure is a B-tree.

6. The data storage and retrieval system of claim 4, further comprising means for scanning said meta access method in key sequence during updating of said basic tree indexed structure.

7. The data storage and retrieval system of claim 4, further comprising means for preventing writing of a fixed length unit on the same fixed length unit of said secondary storage means from which the fixed length unit was read.

8. The data storage and retrieval system of claim 5, further comprising means for scanning said meta access method in key sequence during updating of said basic tree indexed structure.

9. The data storage and retrieval system of claim 5, further comprising means for preventing writing of a fixed length unit on the same fixed length unit of said secondary storage means from which the fixed length unit was read.

10. The data storage and retrieval system of claim 6, in which a data format of fixed length units of said basic tree indexed structure allows prefix compression of keys.

11. The data storage and retrieval system of claim 8, in which a data format of fixed length units of said basic tree indexed structure allows prefix compression of keys.

12. The data storage and retrieval system of claim 2, in which said basic tree indexed structure is a B-tree.

13. The data storage and retrieval system of claim 12, further comprising means for scanning said meta access method in key sequence during updating of said basic tree indexed structure.

14. The data storage and retrieval system of claim 12, further comprising means for preventing writing of a fixed length unit on the same fixed length unit of said secondary storage means from which the fixed length unit was read.

15. The data storage and retrieval system of claim 13, in which a data format of fixed length units of basic tree indexed structure allows prefix compression of keys.

16. The data storage and retrieval system of claim 3, in which said basic tree indexed structure is a B-tree.

17. The data storage and retrieval system of claim 16, further comprising means for preventing writing of a fixed length unit on the same fixed length unit of said secondary storage means from which the fixed length unit was read.

18. The data storage and retrieval system of claim 16, further comprising means for scanning said meta access method in key sequence during updating of said basic tree indexed structure.

19. The data storage and retrieval system of claim 18, in which a data format of fixed length units of said basic tree indexed structure allows prefix compression of keys.

20. The data storage and retrieval system of claim 2, further comprising means for scanning said meta access method in key sequence during updating of said basic tree indexed structure.

21. The data storage and retrieval system of claim 20, in which a data format of fixed length units of said basic tree indexed structure allows prefix compression of keys.

22. The data storage and retrieval system of claim 3, further comprising means for scanning said meta access method in key sequence during updating of said basic tree indexed structure.

23. The data storage and retrieval system of claim 22, in which a data format of fixed length units of said basic tree indexed structure allows prefix compression of keys.

24. The data storage and retrieval system of claim 2, further comprising means for preventing writing of a fixed length unit on the same fixed length unit of said secondary storage means from which the fixed length unit was read.

25. The data storage and retrieval system of claim 3, further comprising means for preventing writing of a fixed length unit on the same fixed length unit of said secondary storage means from which the fixed length unit was read.

* * * * *